United States Patent
Kim

(10) Patent No.: US 12,099,395 B2
(45) Date of Patent: Sep. 24, 2024

(54) METHOD AND APPARATUS FOR ENHANCING DETECTION OF TYPE-C USB CONNECTIONS

(71) Applicant: Samsung Electronics Co., Ltd., Suwon-si (KR)

(72) Inventor: Kyoungwon Kim, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 79 days.

(21) Appl. No.: 18/153,666

(22) Filed: Jan. 12, 2023

(65) Prior Publication Data

US 2023/0152873 A1 May 18, 2023

Related U.S. Application Data

(63) Continuation of application No. PCT/KR2022/009733, filed on Jul. 6, 2022.

(30) Foreign Application Priority Data

Aug. 3, 2021 (KR) .......................... 10-2021-0102040
Oct. 29, 2021 (KR) .......................... 10-2021-0146892

(51) Int. Cl.
*G06F 1/3215* (2019.01)
*G06F 13/38* (2006.01)

(52) U.S. Cl.
CPC .......... *G06F 1/3215* (2013.01); *G06F 13/385* (2013.01); *G06F 2213/0042* (2013.01)

(58) Field of Classification Search
CPC ................. G06F 1/3215; G06F 13/385; G06F 2213/0042; G06F 1/263; G06F 1/266; G06F 13/38; G06F 13/40; G06F 13/42
See application file for complete search history.

(56) References Cited

U.S. PATENT DOCUMENTS

| | | | |
|---|---|---|---|
| 8,065,446 B2 * | 11/2011 | Kang | .................... G06F 13/387 710/16 |
| 10,114,782 B2 | 10/2018 | Kulkarni et al. | |

(Continued)

FOREIGN PATENT DOCUMENTS

| | | |
|---|---|---|
| CN | 106933578 A | 7/2017 |
| JP | 2002-229685 A | 8/2002 |

(Continued)

*Primary Examiner* — Faisal M Zaman
(74) *Attorney, Agent, or Firm* — Jefferson IP Law, LLP

(57) ABSTRACT

An electronic device is provided. The electronic device includes a connector including multiple conductive terminals, a battery, and a power control circuit electrically connected to the connector and the battery, wherein the power control circuit controls a value corresponding to electrical information on a first conductive terminal among the multiple conductive terminals so that a first time interval during which a first value is maintained and a second time interval during which a second value is maintained after the first time interval are alternated for each time interval among the multiple time intervals, identify, in response to the connection of the electronic device to the external device through the cable connected to the connector, whether a size of a time, during which the value is maintained as one of the first value or the second value, is smaller than a designated value, and select a first method.

20 Claims, 11 Drawing Sheets

(56) References Cited

U.S. PATENT DOCUMENTS

| | | |
|---|---|---|
| 10,289,589 B2 | 5/2019 | Chhor et al. |
| 10,303,633 B2 | 5/2019 | Hays et al. |
| 2007/0180174 A1 | 8/2007 | Moosavi |
| 2008/0059661 A1 | 3/2008 | Akahane |
| 2014/0181350 A1 | 6/2014 | Pedro et al. |
| 2014/0325097 A1 | 10/2014 | Manabe |
| 2016/0342492 A1* | 11/2016 | Chen ................... G06F 13/4295 |
| 2018/0032350 A1 | 2/2018 | Lee et al. |
| 2018/0060261 A1* | 3/2018 | Chhor ................. G06F 13/4282 |
| 2018/0089123 A1* | 3/2018 | Kulkarni ............. G06F 13/4022 |
| 2018/0248356 A1 | 8/2018 | Klein |
| 2019/0079130 A1* | 3/2019 | Ko ......................... G01R 31/50 |
| 2019/0289211 A1* | 9/2019 | Asakura ................ H04N 23/65 |
| 2019/0369708 A1* | 12/2019 | K ............................ H02J 9/005 |
| 2021/0119438 A1* | 4/2021 | Cheng ............ H03K 19/017509 |
| 2021/0123985 A1* | 4/2021 | Suzuki ................ G06F 13/4282 |
| 2021/0203168 A1* | 7/2021 | Sharma ................... G06F 1/266 |
| 2021/0364578 A1* | 11/2021 | Nishitani ............... G01R 31/69 |
| 2022/0263278 A1 | 8/2022 | Kim |

FOREIGN PATENT DOCUMENTS

| | | |
|---|---|---|
| KR | 10-2014-0063072 A | 5/2014 |
| KR | 10-2017-0056002 A | 5/2017 |
| KR | 10-2018-0002462 A | 1/2018 |
| KR | 10-2018-0014629 A | 2/2018 |
| KR | 10-2020-0021274 A | 2/2020 |

\* cited by examiner

METHOD AND APPARATUS FOR ENHANCING DETECTION OF TYPE-C USB CONNECTIONS

CROSS-REFERENCE TO RELATED APPLICATION(S)

This application is a continuation application, claiming priority under § 365(c), of an International application No. PCT/KR2022/009733, filed on Jul. 6, 2022, which is based on and claims the benefit of a Korean patent application number 10-2021-0102040, filed on Aug. 3, 2021, in the Korean Intellectual Property Office, and of a Korean patent application number 10-2021-0146892, filed on Oct. 29, 2021, in the Korean Intellectual Property Office, the disclosure of each of which is incorporated by reference herein in its entirety.

TECHNICAL FIELD

The disclosure relates to connection between dual role port (DRP) electronic devices using a universal serial bus (USB) type C cable.

BACKGROUND ART

There has been increasing use of electronic devices that are easy to carry, such as smartphones, tablet personal computers (PCs), and wearable devices, and an electronic device may be connected to an external device (for example, charger or earphone) and may receive data from the external device therethrough or may transmit data to the external device. In addition, the electronic device connected to the external device may receive power from the external device or may provide power to the external device.

For example, a smartphone may be connected to a charger through a universal serial bus (USB) type C connector included in the smartphone, and may receive power from the charger therethrough. The charger may be understood as a device functioning as a source that provides power to another device. Moreover, a device that only provides power to another device may be referred to as a source only device.

The above information is presented as background information only to assist with an understanding of the disclosure. No determination has been made, and no assertion is made, as to whether any of the above might be applicable as prior art with regard to the disclosure.

DISCLOSURE

Technical Problem

During toggling of respective configuration channel (CC) pin states of an electronic device (for example, a first dual role port (DRP) device) including a universal serial bus (USB) type C connector and an external device (for example, a second DRP device) including a USB type C connector, connection, if made, between the electronic device and the external device through the USB type C cables may result in synchronization between toggling timing of the CC pin included in the electronic device and toggling timing of the CC pin included in the external device. As a result, the state of respective CC pins included in the electronic device and the external device may not be fixed to a pull-up state or pull-down state.

In other words, when a first DRP device and a second DRP device are connected to each other through a USB type C cable, the state of the CC pin of each DRP device may not be fixed to a pull-up state or pull-down state, and this may cause delayed establishment or failed establishment of a connection state in which data and/or power can be transmitted/received between the DRP devices.

In addition, if the state of the CC pin of each DRP device is not fixed to a pull-up state or pull-down state, the role of each DRP device in connection with power (for example, sink role or source role) may not be determined. As a result, each role of the first and second DRP devices may be indeterminate in connection with whether to provide power or receive power.

Aspects of the disclosure are to address at least the above-mentioned problems and/or disadvantages and to provide at least the advantages described below. Accordingly, an aspect of the disclosure is to provide a method and an apparatus for solving a phenomenon in which, when DRP devices (for example, first DRP device and second DRP device) are connected through a USB type C cable, the toggling timing of each DRP device is synchronized, thereby causing delayed establishment or failed establishment of a connection state in which data and/or power can be transmitted/received between the DRP devices, and making the role of each device indeterminate in connection with power.

Additional aspects will be set forth in part in the description which follows and, in part, will be apparent from the description, or may be learned by practice of the presented embodiments.

Technical Solution

In accordance with an aspect of the disclosure, an electronic device is provided. The electronic device includes a connector including multiple conductive terminals, a battery, and a power control circuit electrically connected to the connector and the battery, wherein the power control circuit is configured to control a value corresponding to electrical information of a first conductive terminal among the multiple conductive terminals so that a first time interval during which a first value is maintained, and a second time interval during which a second value is maintain after the first time interval are alternated for each time interval among the multiple time intervals, identify, in response to the connection of the electronic device to an external device through a cable connected to the connector, whether a size of a time, during which the value is maintained as one of the first value or the second value, is smaller than a designated value, select, in response to the identifying that a size of a time, during which the value is maintained as one of the first value or the second value, is smaller than the designated value, a first method of differently changing a size of the first time interval for each time interval after a first time point at which the electronic device is connected to the external device among the multiple time intervals, and control, based on the selected first method, the value to be alternated for each time interval after the first time point among the multiple time intervals.

In accordance with another aspect of the disclosure, a method for operating an electronic device is provided. The method includes controlling a value corresponding to electrical information of a first conductive terminal among multiple conductive terminals included in a connector so that a first time interval during which a first value is maintained, and a second time interval during which a second value is maintain after the first time interval are alternated for each time interval among multiple time intervals, identifying, in response to connection of the electronic device to an external device through a cable connected to the connector, whether a size of a time, during which the value is maintained as one of the first value or the second value, is smaller than a designated value, selecting, in response to the identifying that a size of a time, in which the value is maintained as one of the first value or the second value, is smaller than the designated value, a first method of differently changing a size of the first time interval for each time interval after a first time point at which the electronic device is connected to the external device among the multiple time intervals, and controlling, based on the selected first method, the value to be alternated for each time interval after the first time point among the multiple time intervals.

Advantageous Effects

According to various embodiments disclosed herein, when DRP devices are connected to each other through a USB type C cable, the toggling timing of each DRP device may be prevented from being synchronized, and may shorten the time for establishing a connection state in which data and/or power can be transmitted/received between the DRP devices. Accordingly, the role of each DRP device may be determined in connection with power.

Various other advantageous effects identified explicitly or implicitly through the disclosure may be provided.

Other aspects, advantages, and salient features of the disclosure will become apparent to those skilled in the art from the following detailed description, which, taken in conjunction with the annexed drawings, discloses various embodiments of the disclosure.

DESCRIPTION OF DRAWINGS

The above and other aspects, features, and advantages of certain embodiments of the disclosure will be more apparent from the following description taken in conjunction with the accompanying drawings, in which.

Throughout the drawings, like reference numerals will be understood to refer to like parts, components, and structures.

MODE FOR INVENTION

The following description with reference to the accompanying drawings is provided to assist in a comprehensive understanding of various embodiments of the disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the disclosure. Accordingly, it should be apparent to those skilled in the art that the following description of various embodiments of the disclosure is provided for illustration purpose only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

Figure 1:
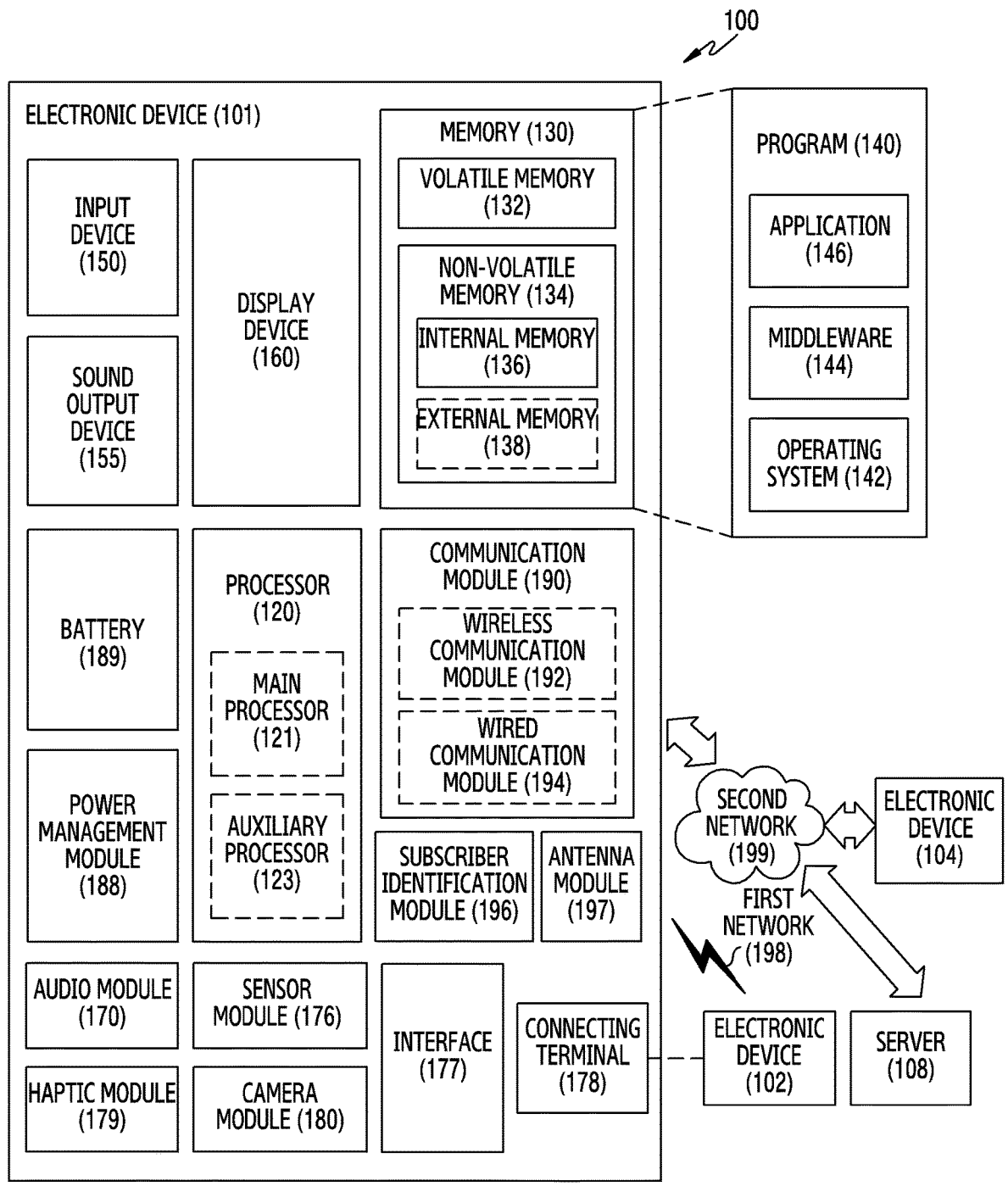
FIG. 1 shows a block diagram of an electronic device in a network environment according to an embodiment of the disclosure.

FIG. 1 is a block diagram illustrating an electronic device in a network environment according to an embodiment of the disclosure.

Referring to FIG. 1, an electronic device 101 in a network environment 100 may communicate with an electronic device 102 via a first network 198 (e.g., a short-range wireless communication network), or at least one of an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input module 150, a sound output module 155, a display module 160, an audio module 170, a sensor module 176, an interface 177, a connecting terminal 178, a haptic module 179, a camera module 180, a power management module 188, a battery 189, a communication module 190, a subscriber identification module (SIM) 196, or an antenna module 197. In some embodiments, at least one of the components (e.g., the connecting terminal 178) may be omitted from the electronic device 101, or one or more other components may be added in the electronic device 101. In some embodiments, some of the components (e.g., the sensor module 176, the camera module 180, or the antenna module 197) may be implemented as a single component (e.g., the display module 160).

The processor 120 may execute, for example, software (e.g., a program 140) to control at least one other component (e.g., a hardware or software component) of the electronic device 101 coupled with the processor 120, and may perform various data processing or computation. According to one embodiment, as at least part of the data processing or computation, the processor 120 may store a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), or an auxiliary processor 123 (e.g., a graphics processing unit (GPU), a neural processing unit (NPU), an image signal processor (ISP), a sensor hub processor, or a communication processor (CP)) that is operable independently from, or in conjunction with, the main processor 121. For example, when the electronic device 101 includes the main processor 121 and the auxiliary processor 123, the auxiliary processor 123 may be adapted to consume less power than the main processor 121, or to be specific to a specified function. The auxiliary processor 123 may be implemented as separate from, or as part of the main processor 121.

The auxiliary processor 123 may control at least some of functions or states related to at least one component (e.g., the display module 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). According to an embodiment, the auxiliary processor 123 (e.g., an image signal processor or a communication processor) may be implemented as part of another component (e.g., the camera module 180 or the communication module 190) functionally related to the auxiliary processor 123. According to an embodiment, the auxiliary processor 123 (e.g., the neural processing unit) may include a hardware structure specified for artificial intelligence model processing. An artificial intelligence model may be generated by machine learning. Such learning may be performed, e.g., by the electronic device 101 where the artificial intelligence is performed or via a separate server (e.g., the server 108). Learning algorithms may include, but are not limited to, e.g., supervised learning, unsupervised learning, semi-supervised learning, or reinforcement learning. The artificial intelligence model may include a plurality of artificial neural network layers. The artificial neural network may be a deep neural network (DNN), a convolutional neural network (CNN), a recurrent neural network (RNN), a restricted boltzmann machine (RBM), a deep belief network (DBN), a bidirectional recurrent deep neural network (BRDNN), deep Q-network or a combination of two or more thereof but is not limited thereto. The artificial intelligence model may, additionally or alternatively, include a software structure other than the hardware structure.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, or an application 146.

The input module 150 may receive a command or data to be used by another component (e.g., the processor 120) of the electronic device 101, from the outside (e.g., a user) of the electronic device 101. The input module 150 may include, for example, a microphone, a mouse, a keyboard, a key (e.g., a button), or a digital pen (e.g., a stylus pen).

The sound output module 155 may output sound signals to the outside of the electronic device 101. The sound output module 155 may include, for example, a speaker or a receiver. The speaker may be used for general purposes, such as playing multimedia or playing record. The receiver may be used for receiving incoming calls. According to an embodiment, the receiver may be implemented as separate from, or as part of the speaker.

The display module 160 may visually provide information to the outside (e.g., a user) of the electronic device 101. The display module 160 may include, for example, a display, a hologram device, or a projector and control circuitry to control a corresponding one of the display, hologram device, and projector. According to an embodiment, the display module 160 may include a touch sensor adapted to detect a touch, or a pressure sensor adapted to measure the intensity of force incurred by the touch.

The audio module 170 may convert a sound into an electrical signal and vice versa. According to an embodiment, the audio module 170 may obtain the sound via the input module 150, or output the sound via the sound output module 155 or a headphone of an external electronic device (e.g., an electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wiredly) or wirelessly. According to an embodiment, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to an embodiment, the connecting terminal 178 may include, for example, an HDMI connector, a USB connector, an SD card connector, or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, image signal processors, or flashes.

The power management module 188 may manage power supplied to the electronic device 101. According to one embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as Bluetooth™, wireless-fidelity (Wi-Fi) direct, or infrared data association (IrDA)) or the second network 199 (e.g., a long-range communication network, such as a legacy cellular network, a 5th generation (5G) network, a next-generation communication network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the subscriber identification module 196.

The wireless communication module 192 may support a 5G network, after a 4th generation (4G) network, and next-generation communication technology, e.g., new radio (NR) access technology. The NR access technology may support enhanced mobile broadband (eMBB), massive machine type communications (mMTC), or ultra-reliable and low-latency communications (URLLC). The wireless communication module 192 may support a high-frequency band (e.g., the mmWave band) to achieve, e.g., a high data transmission rate. The wireless communication module 192 may support various technologies for securing performance on a high-frequency band, such as, e.g., beamforming, massive multiple-input and multiple-output (massive MIMO), full dimensional MIMO (FD-MIMO), array antenna, analog beam-forming, or large scale antenna. The wireless communication module 192 may support various requirements specified in the electronic device 101, an external electronic device (e.g., the electronic device 104), or a network system (e.g., the second network 199). According to an embodiment, the wireless communication module 192 may support a peak data rate (e.g., 20 Gbps or more) for implementing eMBB, loss coverage (e.g., 164 dB or less) for implementing mMTC, or U-plane latency (e.g., 0.5 ms or less for each of downlink (DL) and uplink (UL), or a round trip of 1 ms or less) for implementing URLLC.

The antenna module 197 may transmit or receive a signal or power to or from the outside (e.g., the external electronic device) of the electronic device 101. According to an embodiment, the antenna module 197 may include an antenna including a radiating element composed of a conductive material or a conductive pattern formed in or on a substrate (e.g., a printed circuit board (PCB)). According to an embodiment, the antenna module 197 may include a plurality of antennas (e.g., array antennas). In such a case, at least one antenna appropriate for a communication scheme used in the communication network, such as the first network 198 or the second network 199, may be selected, for example, by the communication module 190 (e.g., the wireless communication module 192) from the plurality of antennas. The signal or the power may then be transmitted or received between the communication module 190 and the external electronic device via the selected at least one antenna. According to an embodiment, another component (e.g., a radio frequency integrated circuit (RFIC)) other than the radiating element may be additionally formed as part of the antenna module 197.

According to various embodiments, the antenna module 197 may form a mmWave antenna module. According to an embodiment, the mmWave antenna module may include a printed circuit board, a RFIC disposed on a first surface (e.g., the bottom surface) of the printed circuit board, or adjacent to the first surface and capable of supporting a designated high-frequency band (e.g., the mmWave band), and a plurality of antennas (e.g., array antennas) disposed on a second surface (e.g., the top or a side surface) of the printed circuit board, or adjacent to the second surface and capable of transmitting or receiving signals of the designated high-frequency band.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. Each of the electronic devices 102 or 104 may be a device of a same type as, or a different type, from the electronic device 101. According to an embodiment, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, mobile edge computing (MEC), or client-server computing technology may be used, for example. The electronic device 101 may provide ultra low-latency services using, e.g., distributed computing or mobile edge computing. In another embodiment, the external electronic device 104 may include an internet-of-things (IoT) device. The server 108 may be an intelligent server using machine learning and/or a neural network. According to an embodiment, the external electronic device 104 or the server 108 may be included in the second network 199. The electronic device 101 may be applied to intelligent services (e.g., smart home, smart city, smart car, or healthcare) based on 5G communication technology or IoT-related technology.

The electronic device according to various embodiments may be one of various types of electronic devices. The electronic devices may include, for example, a portable communication device (e.g., a smartphone), a computer device, a portable multimedia device, a portable medical device, a camera, a wearable device, or a home appliance. According to an embodiment of the disclosure, the electronic devices are not limited to those described above.

It should be appreciated that various embodiments of the disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include any one of, or all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively," as "coupled with," "coupled to," "connected with," or "connected to" another element (e.g., a second element), it means that the element may be coupled with the other element directly (e.g., wiredly), wirelessly, or via a third element.

As used in connection with various embodiments of the disclosure, the term "module" may include a unit implemented in hardware, software, or firmware, and may interchangeably be used with other terms, for example, "logic," "logic block," "part," or "circuitry." A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., the program 140) including one or more instructions that are stored in a storage medium (e.g., internal memory 136 or external memory 138) that is readable by a machine (e.g., the electronic device 101). For example, a processor (e.g., the processor 120) of the machine (e.g., the electronic device 101) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment, a method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities, and some of the multiple entities may be separately disposed in different components. According to various embodiments, one or more of the above-described components may be omitted, or one or more other components may be added. Alternatively or additionally, a plurality of components (e.g., modules or programs) may be integrated into a single component. In such a case, according to various embodiments, the integrated component may perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

Figure 2:
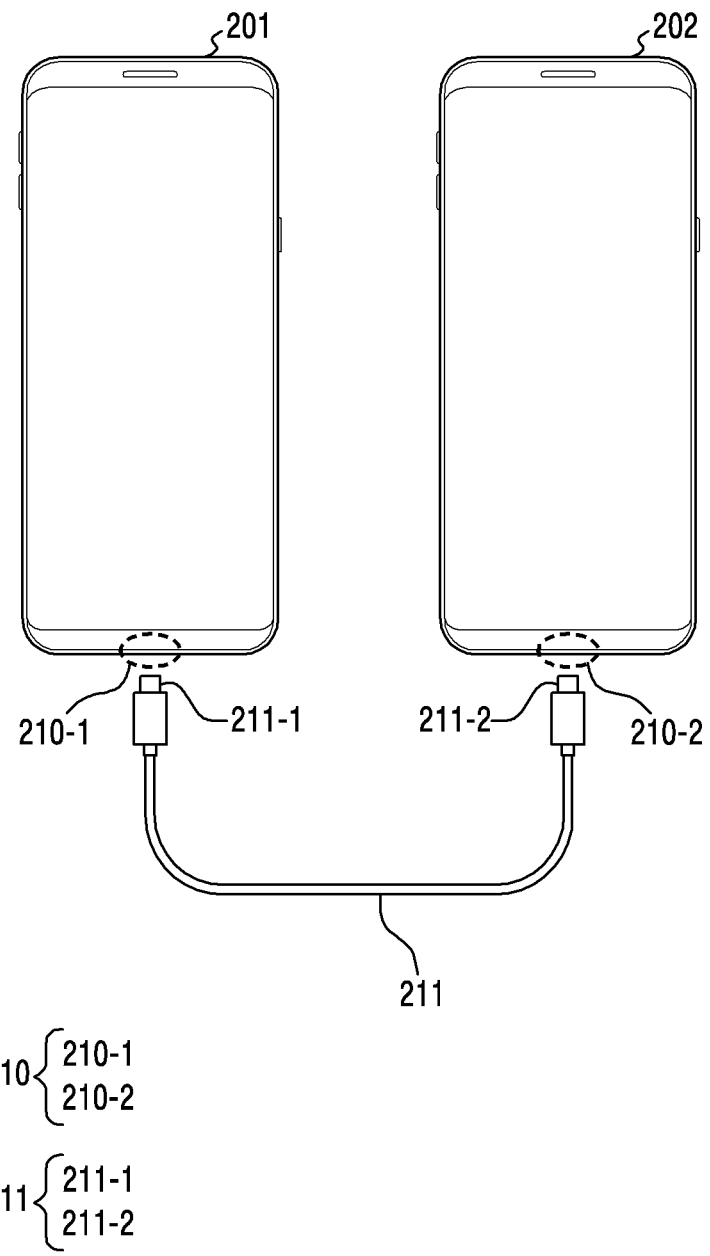
FIG. 2 shows an electronic device connected to an external device through a universal serial bus (USB) type C cable according to an embodiment of the disclosure.

FIG. 2 shows an electronic device connected to an external device through a USB type C cable according to an embodiment of the disclosure.

Referring to FIG. 2, each of an electronic device 201 and an external device 202 may be referred to as an electronic device capable of supporting a dual role port (DRP) function. For example, the electronic device 201 and the external device 202 may include a smartphone, a tablet PC, or a wearable device. The electronic device 201 and the external device 202 may be connected to each other through the USB type C cable 211. The DRP function may be referred to as a function for the electronic device 201 to be operated as a downstream facing port (DFP) or an upstream facing port (UFP). Hereinafter, the description will be given on the premise that the electronic device 201 and the external device 202 support the DRP function.

According to an embodiment, when the electronic device 201 operates as a DFP, the electronic device 201 may serve as a source in terms of power and as a host in terms of data. For example, when the electronic device 201 serves as a source in a state in which the electronic device 201 and the external device 202 are connected to each other through the USB type C cable 211, the electronic device 201 may supply power to the external device 202.

According to an embodiment, when the electronic device 201 operates as a UFP, the electronic device 201 may serve as a sink in terms of power and as a device in terms of data. For example, when the electronic device 201 serves as a sink in a state in which the electronic device 201 and the external device 202 are connected to each other through the USB type C cable 211, the electronic device 201 may receive power from the external device 202.

According to an embodiment, the electronic device 201 may include a first connector 210-1. The first connector 210-1 may include multiple conductive terminals. The multiple conductive terminals may be arranged to comply with the USB type C standard. The multiple conductive terminals may include configuration channel (CC) pins (e.g., CC1 pin and CC2 pin).

According to an embodiment, the electronic device 201 may serve as a source or a sink in a state in which the electronic device 201 and the external device 202 are connected to each other through the USB type C cable 211, based on an electrical state of the CC1 pin or the CC2 pin included in the electronic device 201. The electrical state may include a resistance value of the CC1 pin or the CC2 pin. For example, the CC1 pin or the CC2 pin may include a pull-up resistance value and a full-down resistance value.

According to an embodiment, the external device 202 may include a second connector 210-2. The description with respect to the first connector 210-1 may be identically applied to the second connector 210-2. The description with respect to the electronic device 201 may be identically applied to the external device 202.

According to an embodiment, the USB type C cable 211 may include a first cable connector 211-1 and a second cable connector 211-2 at one end and the other end, respectively. Each of the first cable connector 211-1 and the second cable connector 211-2 may include multiple conductive terminals. The multiple conductive terminals included in each of the first cable connector 211-1 and the second cable connector 211-2 may be arranged to comply with the USB type C standard.

According to an embodiment, although not shown in FIG. 2, the electronic device 201 may be connected to a charger through the USB type C connector (for example, the first connector 210-1) included in the electronic device 201 and may receive power from the charger. The charger may be understood as a device serving as a source for supplying power to another electronic device (for example, the electronic device 201). The device for only supplying power to another electronic device may be referred to as a source only device.

According to an embodiment, although not shown in FIG. 2, the electronic device 201 may be connected to an earphone through the USB type C connector (for example, the first connector 210-1) included in the electronic device 201 and may supply power to the earphone. The earphone may be understood as a device serving as a sink for receiving power from another electronic device (for example, the electronic device 201). The device for only receiving power from another electronic device may be referred to as a sink only device.

According to an embodiment, the electronic device 201 may be connected to an external device through the USB type C cable 211. The electronic device 201 may serve as a source for supplying power to the external device or a sink for receiving power from the external device depending on the type (for example, the source only device, the sink only device, and a device supporting a DRP function) of the external device. For example, the electronic device 201 (for example, a smartphone) may be referred to as a dual role port (DRP) device capable of serving as a source or a sink depending on the type of the external device.

According to an embodiment, the electronic device 201 (for example, a smartphone) may include a USB type C connector (for example, the first connector 210-1) capable of connecting the USB type C cable 211, and serve to supply power to the external device 202 or to receive power from the external device 202 depending on the type of the external device 202.

According to an embodiment, the role of the electronic device 201 may not be determined, in terms of power, whether to serve to supply power to the external device 202 or serve to receive power from the external device 202 until the electronic device 201 is connected to the external device 202 through the USB type C cable 211.

According to an embodiment, while the role of the electronic device 201 has not been yet determined in terms of power, when the electronic device 201 is connected to the external device 202 through the USB type C cable 211, the role (for example, a role of source or a role of sink) of the electronic device 201 may be determined in terms of power according to an electrical state (for example, a pull-up state or pull-down state) of the CC pin (for example, CC1 pin or CC2 pin) of the USB type C connector (for example, the first connector 210-1) included in the electronic device 201.

According to an embodiment, the electrical state of the CC pin included in the electronic device 201 may be alternatively switched into a pull-up state and pull-down state. The role of the electronic device 201 may be determined in terms of power, according to the electrical state of the CC pin of the electronic device 201 at a time point when the electronic device 201 is connected to the external device 202 through the USB type C cable 211. The alternative switching of the electrical state of the CC pin into the pull-up state or pull-down state may be referred to as toggling (or DRP toggling).

According to an embodiment, while the electrical state of the CC pin of the electronic device 201 is being toggled, when the electronic device 201 is connected to a source only device through the USB type C cable 211, the electrical state of the CC pin of the electronic device 201 may be fixed to the pull-down state and the electronic device 201 may receive power from the source only device. When the electrical state of the CC pin of the electronic device 201 is fixed to the pull-down state, the electronic device 201 may be determined to serve as a sink.

According to an embodiment, while the electrical state of the CC pin of the electronic device 201 is being toggled, when the electronic device 201 is connected to a sink only device through the USB type C cable 211, the electrical state of the CC pin of the electronic device 201 may be fixed to the pull-up state and the electronic device 201 may supply power to the source only device. When the electrical state of the CC pin of the electronic device 201 is fixed to the pull-up state, the electronic device 201 may be determined to serve as a source.

Figure 3:
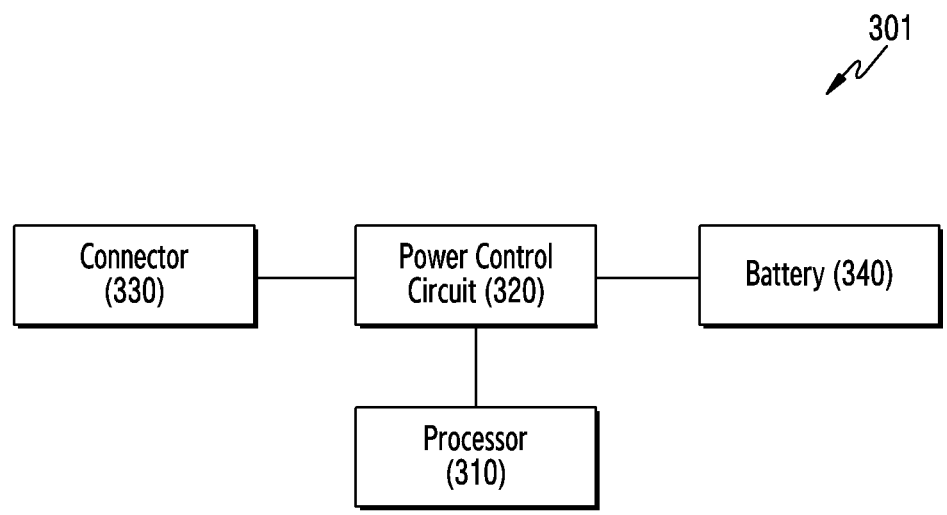
FIG. 3 shows a block structure diagram of an electronic device according to an embodiment of the disclosure.

FIG. 3 shows a block structure diagram of an electronic device according to an embodiment of the disclosure.

Referring to FIG. 3, an electronic device 301 may include a processor 310, a power control circuit 320, a connector 330, and a battery 340. Components included in the electronic device 301 may not be limited to the components shown in FIG. 3 (for example, the processor 310, the power control circuit 320, the connector 330, and the battery 340). The components of the electronic device 301 shown in FIG. 3 may be replaced with another component or an additional component may be added in the electronic device 301. For example, a portion of the contents of the electronic device 101 in FIG. 1 may be applied to the electronic device 301 in FIG. 3.

According to an embodiment, the processor 310 (for example, an application processor (AP)) may execute instructions stored in the memory to control operations of the components (for example, the power control circuit 320 and the battery 340) of the electronic device 301. The processor 310 may be electrically and/or operatively connected to the power control circuit 320. The processor 310 may control at least one other component (for example, the power control circuit 320) connected to the processor 310 by executing software. The processor 310 may obtain a command from the component included in the electronic device 301, interpret the obtained command, and process or calculate various data according to the interpreted command.

According to an embodiment, the power control circuit 320 may be electrically and/or operatively connected to the processor 310, the connector 330, and the battery 340. The power control circuit 320 may control a voltage of power supplied to each component included in the electronic device 301.

According to an embodiment, the power control circuit 320 may identify the electrical state of the CC1 pin or the CC2 pin among multiple conductive terminals included in the connector 330. For example, the power control circuit 320 may identify whether the electrical state of the CC1 pin or the CC2 pin included in the connector 330 is a pull-up resistance state or a pull-down resistance state. The power control circuit 320 may determine, based on the electrical state of the connector 330, whether the electronic device 301 will supply power to the external device 302 or receive power from the external device 302. For example, in a state in which the electronic device 301 is connected to the external device 302 through the USB type C cable (for example, the USB type C cable 211 in FIG. 2), when the CC1 pin or the CC2 pin of the connector 330 is in the pull-up resistance state, the power control circuit 320 may determine the electronic device 301 to serve as a source and supply the power stored in the battery 340 to the external device 302. For another example, in a state in which the electronic device 301 is connected to the external device 302 through the USB type C cable (for example, the USB type C cable 211 in FIG. 2), when the CC1 pin or the CC2 pin of the connector 330 is in the pull-down resistance state, the power control circuit 320 may determine the electronic device 301 to serve as a sink and supply the power received from the external device 302 to the battery 340.

According to an embodiment, the connector 330 may be understood as the first connector 210-1 shown in FIG. 2. The connector 330 may be electrically and/or operatively connected to the power control circuit 320. The connector 330 may include multiple conductive terminals. The multiple conductive terminals included in the connector 330 may include the CC1 pin and/or the CC2 pin.

According to an embodiment, the battery 340 may supply power to the electronic device 301 so that the electronic device 301 operates. The battery 340 may receive power from the external device (for example, a charger) and store the received power. The battery 340 may supply power to the external device (for example, a smartphone and an earphone).

Figure 4:
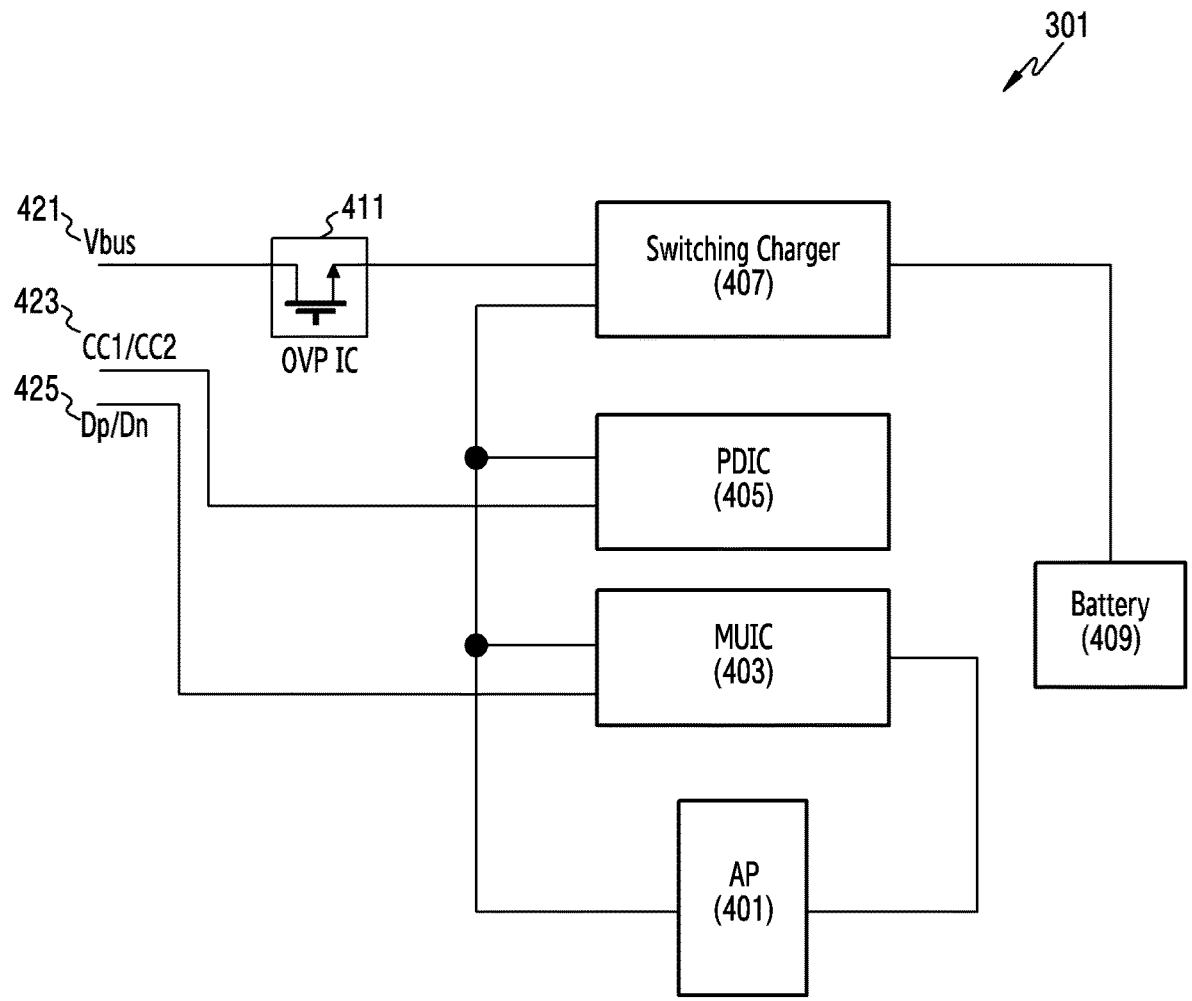
FIG. 4 shows a power control circuit and a connector according to an embodiment of the disclosure.

FIG. 4 shows a power control circuit and a connector according to an embodiment of the disclosure.

Referring to FIG. 4, an electronic device 301 may include an application processor (AP) 401, a micro-sub interface controller (MUIC) 403, a power delivery integrated chip (PDIC) 405, a switching charger 407, a battery 409, an over voltage protection IC 411, a Vbus pin 421, a CC1/CC2 pin 423, and a data differential Dp/Dn pin 425.

According to an embodiment, the MUIC 403, the PDIC 405, and the switching charger 407 may be implemented as separate ICs. According to an embodiment, the MUIC 403, the PDIC 405, and the switching charger 407 may be implemented into one integrated IC as the power control circuit 320.

According to an embodiment, multiple conductive terminals included in the connector 330 may include the Vbus pin 421, the CC1/CC2 pin 423, and the Dp/Dn pin 425. The multiple conductive terminals may be referred to pins arranged to comply with the USB type C standard and FIG. 4 shows the Vbus pin 421, the CC1/CC2 pin 423, and the Dp/Dn pin 425 corresponding to a portion of the multiple conductive terminals.

According to an embodiment, the application processor 401 may be electrically and/or operatively connected to the MUIC 403, the PDIC 405, and the switching charger 407. The application processor 401 may be understood as the processor 310 shown in FIG. 3. The application processor 401 may perform data communication with the MUIC 403. The application processor 401 may change the role of the electronic device 301 in terms of power, based on the data received from the MUIC 403. For example, when the electronic device 301 serves as a source, the application processor 401 may change the role of the electronic device 301 from the source to a sink, based on the data received from the MUIC 403. For example, when the electronic device 301 serves as a sink, the application processor 401 may change the role of the electronic device 301 from sink to a source, based on the data received from the MUIC 403.

According to an embodiment, the MUIC 403 may be operatively and/or electrically connected to the Dp/Dn pin 425. The MUIC 403 may receive data from a device (for example, the external device 202) or transmit data to the device through the Dp/Dn pin 425. For example, when the electronic device 201 serves as the DFP in a state in which the electronic device 201 and the external device 202 are connected to each other through the USB type C cable 211, the MUIC 403 may transmit data to the external device 202 through the Dp/Dn pin 425. For another example, when the electronic device 201 serves as the UFP in a state in which the electronic device 201 and the external device 202 are connected to each other through the USB type C cable 211, the MUIC 403 may receive data from the external device 202 through the Dp/Dn pin 425.

According to an embodiment, the MUIC 403 may receive data related to the changing of the role of the electronic device 301 in terms of power from the external device 202 through the Dp/Dn pin 425.

According to an embodiment, the PDIC 405 may be operatively and/or electrically connected to the CC1/CC2 pin 423. The PDIC 405 may identify an electrical state of the CC1/CC2 pin 423. For example, the PDIC 405 may identify the electrical state of the CC1/CC2 pin 423 as the pull-up resistance state or the pull-down resistance state.

According to an embodiment, the PDIC 405 may determine, based on the identified electrical state of the CC1/CC2 pin 423, the role of the electronic device 301 in terms of power. For example, when the PDIC 405 identifies the electrical state of the CC1/CC2 pin as the pull-up state, the PDIC 405 may determine the role of the electronic device 301 in terms of power as a source. For another example, when the PDIC 405 identifies the electrical state of the CC1/CC2 pin as the pull-down state, the PDIC 405 may determine the role of the electronic device 301 in terms of power as a sink. The PDIC 405 may provide the information on the determined role of the electronic device 301 to the application processor 401.

According to an embodiment, the switching charger 407 may include a charging controller and a buck-boost converter for supplying power to the battery 409. The buck-boost converter may raise or reduce a voltage of power received from an external device (for example, the external device 202). The charging controller may cause the battery 409 to supply power to an external device (for example, the external device 202) or cause the battery 409 to receive power from an external device.

According to an embodiment, the switching charger 407 may supply the power received from an external device (for example, the external device 202) through the Vbus pin 421 to the battery 409. For example, when the electronic device 301 serves as a source in terms of power, the switching charger 407 may supply the power stored in the battery 409 to an external device (for example, the external device 202). For another example, when the electronic device 301 serves as a sink in terms of power, the switching charger 407 may supply the power received from an external device (for example, the external device 202) to the battery 409.

According to an embodiment, the battery 409 may store the power received from an external device (for example, the external device 202) or supply the power stored in the battery 409 to an external device (for example, the external device 202).

According to an embodiment, the over voltage protection IC 411 may prevent a circuit of the electronic device 201 from overvoltage.

According to an embodiment, the Vbus pin 421 may be understood as a terminal for the electronic device 301 to receive power from an external device (for example, the external device 202) or to supply power to an external device (for example, the external device 202). For example, when the electronic device 301 serves as a source in terms of power in a state in which the electronic device 301 and the external device 202 are connected to each other through the USB type C cable 211, the power control circuit 320 or the switching charger 407 may supply the power stored in the battery 409 to the external device 202 through the Vbus pin 421. For example, when the electronic device 301 serves as a sink in terms of power in a state in which the electronic device 301 and the external device 202 are connected to each other through the USB type C cable 211, the power control circuit 320 or the switching charger 407 may receive power from the external device 202 and supply the power to the battery 409 through the Vbus pin 421.

According to an embodiment, the CC1/CC2 pin 423 may be understood as one of multiple conductive terminals included in a USB type C connector (for example, the first connector 210-1 in FIG. 2 and the connector 330 in FIG. 3). The USB type C connector may include a configuration channel (CC) pin and may include the CC1 pin and the CC2 pin. An electrical state of the CC1/CC2 pin 423 may include a pull-up resistance state or a pull-down resistance state. When the electrical state of the CC1/CC2 pin 423 is in the pull-up resistance state, the electronic device 301 may serve as a source in terms of power. When the electrical state of the CC1/CC2 pin 423 is in the pull-down state, the electronic device 301 may serve as a sink in terms of power. The CC1/CC2 pin 423 may be understood as an identification terminal capable of being in an electrical state so that the role of the electronic device 301 in term of power may be determined.

Figure 5:
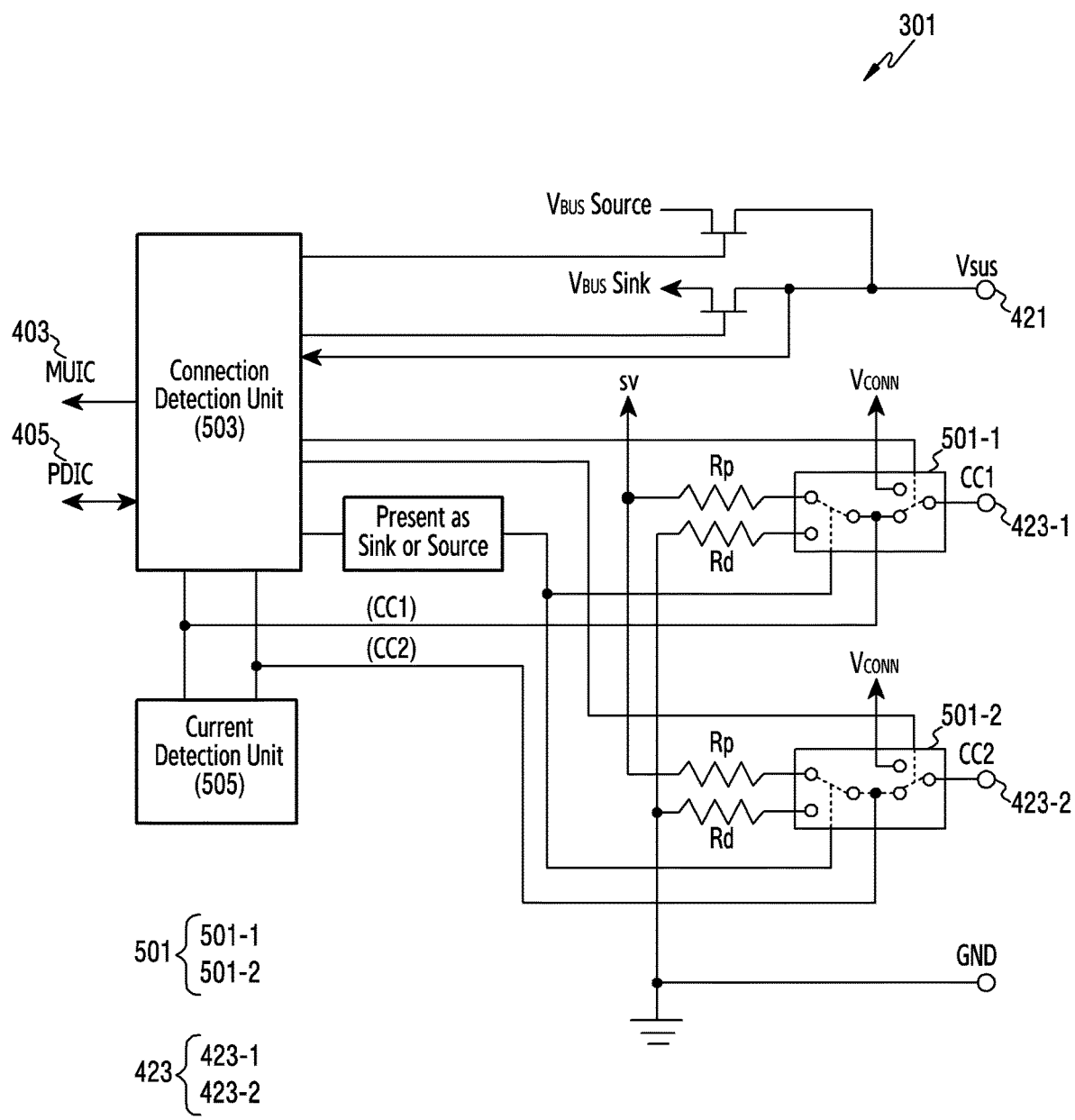
FIG. 5 shows a circuit diagram illustrating a dual role port (DRP) function according to an embodiment of the disclosure.

FIG. 5 shows a circuit diagram illustrating a DRP function according to an embodiment of the disclosure.

Referring to FIG. 5, as an electrical state of a CC1/CC2 pin 423 (for example, a CC1 pin 423-1 or a CC2 pin 423-2) is determined as a pull-up state or pull-down state, an electronic device 301 may be determined to serve as a source or a sink and the electronic device 301 may perform the DRP function. Hereinafter, the description having been given with reference to FIG. 3 and FIG. 4 will be omitted.

According to an embodiment, the electronic device 301 may include a first switch 501-1 for controlling the electrical state of the CC1 pin 423-1, a second switch 501-2 for controlling the electrical state of the CC2 pin 423-2, a Vbus pin 421, a connection detection unit 503, a current detection unit 505, a MUIC 403, and a PDIC 405.

According to an embodiment, the first switch 501-1 may connect the CC1 pin 423-1 to an Rp resistance or an Rd resistance. The second switch 501-2 may connect the CC2 pin 423-2 to an Rp resistance or an Rd resistance. The Rp resistance and the Rd resistance may be understood as a pull-up resistance and a pull-down resistance, respectively. The first switch 501-1 or the second switch 501-2 may respectively connect the CC1 pin 423-1 or the CC2 pin 423-2 to the Rp resistance or the Rd resistance so as to perform a toggling operation. The toggling operation may be understood as an operation of alternatively changing the electronic state of the CC1/CC2 pin 423 into the pull-up resistance state or the pull-down resistance state. Before the electronic device 301 is connected to the external device 202, the electronic device 301 may perform the toggling operation. When the electronic device 301 is connected to the external device 202 during performing the toggling operation, the electronic device 301 may determine a role of the electronic device 301 (for example, the PDIC 405) in terms of power according to the electrical state of the CC1/CC2 pin 423 identified in response to the connection. When the role of the electronic device 301 is determined, the electronic device 301 may stop the toggling operation. After the role of the electronic device 301 is determined, the electronic device 301 may perform a power delivery (PD) communication. For example, the electronic device 301 may perform the PD communication through the Dp/Dn pin 425.

According to an embodiment, the connection detection unit 503 may detect connection to an external device (for example, the external device 202) through the CC1 pin 423-1 or the CC2 pin 423-2. In response to the detection of the connection to the extern device, the connection detection unit 503 may provide information on an electrical state of the CC1/CC2 pin 423 to the PDIC 405. The PDIC 405 may determine a role of the electronic device 301 in terms of power, based on the information. Based on the determined role, the electronic device 301 may supply power to an external device (for example, the external device 202 or an earphone) through the Vbus pin 421 or may receive power from an external device (for example, the external device 202 or a battery).

According to an embodiment, the current detection unit 505 may detect a current which the electronic device 301 receives from an external device (for example, the external device 202) or supplies to an external device (for example, the external device 202).

Figure 6:
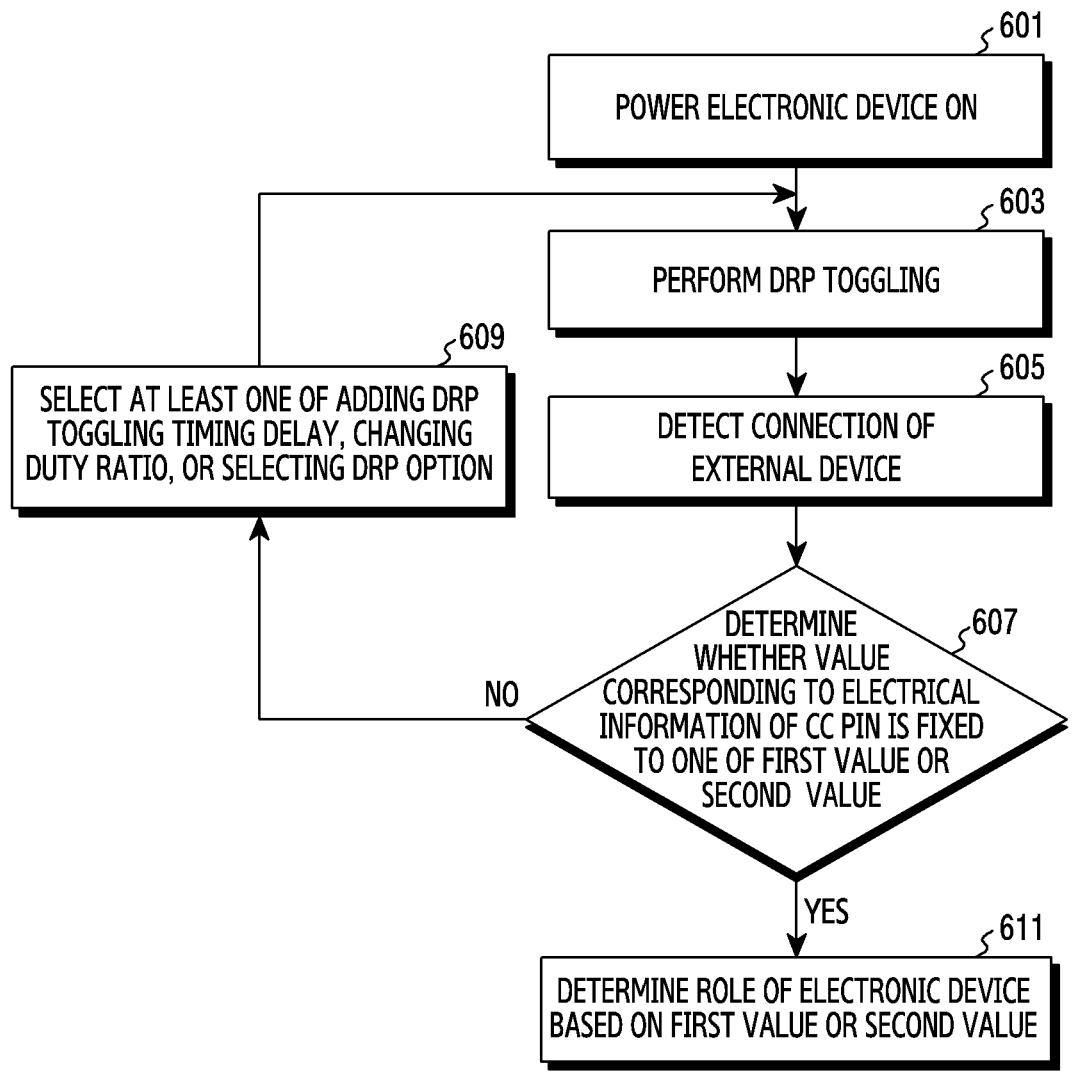
FIG. 6 shows a flowchart of a method of an electronic device for performing DRP toggling according to an embodiment of the disclosure.

FIG. 6 shows a flowchart of a method of an electronic device for performing DRP toggling according to an embodiment of the disclosure.

Referring to FIG. 6, in operation 601, an electronic device 301 may be powered on. For example, the electronic device 301 may be powered on in response to a user input for powering on the electronic device 301. The operation of powering on the electronic device 301 may include an operation of powering on an application processor (for example, the application processor 401 in FIG. 4 and the processor 310 in FIG. 3). In a state in which the power of the electronic device 301 is powered on, a power management IC (PMIC) of the application processor may supply virtual input/output (VIO) power to the PDIC 405. When the VIO power received from the power management IC is high, the PDIC 405 may be powered on.

In operation 603, when the PDIC 405 is powered on, the PDIC 405 may perform DRP toggling. The DRP toggling may be referred to an operation in which an electrical state of a CC pin (for example, the CC1 pin 423-1 or the CC2 pin 423-2 in FIG. 5) is alternately changed to a pull-up resistance state or pull-down resistance state for each time interval. When the electronic device 301 is not connected to the external device 202 through the connector 330 in a state in which the PDIC 405 is powered on, the PDIC 405 may perform the DRP toggling. The PDIC 405 may perform the DRP toggling until the role of the electronic device 301 in terms or power is determined. For example, the PDIC 405 may perform the DRP toggling until the electrical state of the CC pin (for example, the CC1 pin 423-1 or the CC2 pin 423-2 in FIG. 5) included in the electronic device 301 is fixed to the pull-up resistance state or the pull-down state. When the electrical state of the CC pin (for example, the CC1 pin 423-1 or the CC2 pin 423-2 in FIG. 5) included in the electronic device 301 is fixed to the pull-up resistance state or the pull-down state, the PDIC 405 may determine the role of the electronic device 301 in terms of power.

In operation 605, while the PDIC 405 is performing the DRP toggling, the electronic device 301 (for example, the connection detection unit 503 in FIG. 5) may detect connection of an external device (for example, the external device 202). For example, while the electronic device 301 (for example, the PDIC 405) is performing the DRP toggling, the electronic device 301 may detect that the electronic device 301 and the external device 202 are connected to each other through the USB type C cable 211 connected to the connector 330.

In operation 607, when the electronic device 301 and the external device 202 are connected to each other through the USB type C cable 211 connected to the connector 330 while the PDIC 405 is performing the DRP toggling, the electronic device 301 (for example, the PDIC 405) may identify whether a value corresponding to electrical information of the CC pin (for example, the CC1 pin 423-1 or the CC2 pin 423-2 in FIG. 5) is fixed to one of a first value or a second value. For example, when the time during which a value corresponding to electrical information of the CC pin (for example, the CC1 pin 423-1 or the CC2 pin 423-2 in FIG. 5) is maintained one of a first value or a second value is larger than a designated value, the electronic device 301 (for example, the PDIC 405) may determine that the value is fixed to one of the first value or the second value. For another example, when the time during which the value is fixed to one of the first value or the second value is smaller than a designated value is maintained, the electronic device 301 (for example, the PDIC 405) may determine that the value is not fixed to one of the first value or the second value. The fixation of the value to the first value or the second value may be referred to the toggling operation being stopped. The electrical information of the CC pin may include information on a resistance. A value corresponding to the electrical information of the CC pin may be referred to as a resistance value. The first value may include a value corresponding to a pull-up resistance (Rp), and the second value may include a value corresponding to a pull-down resistance (Rd). According to an embodiment, when the value is not fixed to one of the first value or the second value, the electronic device 301 may perform operation 609, and when the value is fixed to one of the first value or the second value, the electronic device 301 may perform operation 611.

In operation 609, the electronic device 301 (for example, the PDIC 405) may select at least one of DRP toggling timing delay addition (hereinafter, a "first method"), duty ratio change (hereinafter, a "second method"), or DRP option selection (hereinafter, a "third method"). The electronic device 301 may perform the DRP toggling by applying the selected method.

According to an embodiment, the first method may be referred to as a method of randomly adding a delay value to a DRP toggling timing. The DRP toggling timing may include multiple time intervals. Each time internal included in the multiple time intervals may include a first time during which the value is maintained as the first value and a second time during which the value is maintained as the second value. The randomly adding the delay value may be referred to as randomly changing a size of the first time included in each of the time intervals for each time interval. For example, the randomly adding the delay value may be referred to as changing a size of the first time included in a first time interval among the multiple time intervals by a first size and changing a size of the first time included in a second time interval among the multiple time intervals by a second size. The second time interval may be referred to as a time interval after the first time interval. A size of each time interval may be changed as much as a size of the first time is changed. For example, when the first time is increased by 1 ms, the time interval including the first time may be increased by 1 ms.

According to embodiment, the first method may be referred to as a method of applying delay time to a start time point of the first time interval in each time interval among the multiple time intervals after the electronic device 301 is connected to the external device 202.

According to an embodiment, the second method may be referred to as changing a first ratio corresponding to a ratio by which the first time occupies each time interval among the multiple time intervals. The ratio of the second time in each time interval may be referred to as a second ratio. The changing duty ratio may be referred to as changing the first ratio included in each time interval identically for each time interval. For example, the first ratio may be identically increased by 5% for each time interval. The second ratio may be inversely changed as much as the first ratio included in each time interval is changed. For example, when the first ratio is increased by 5%, the second ratio may be reduced by 5%. Even when the first ratio included in each time interval is changed, a size of each time interval may not be changed.

According to an embodiment, the third method may be referred to as swapping the first value and the second value for each other with respect to the value. For example, the third method may include a method of changing the value from the first value to the second value and a method of changing the value from the second value to the first value. When the electronic device 301 and the external device 202 are connected to each other through the USB type C cable 211 while the electronic device 301 is performing the DRP toggling, the electronic device 301 may identify a value corresponding to the electrical information of the CC pin (for example, the CC1 pin 423-1 or the CC2 pin 423-2 in FIG. 5) at the first time point at which the electronic device 301 and the external device 202 are connected to each other. When a value corresponding to the electrical information of the CC pin is the first value at the first time point, the electronic device 301 may apply the third method to change the value from the first value to the second value. When a value corresponding to the electrical information of the CC pin is the second value at the first time point, the electronic device 301 may apply the third method to change the value from the second value to the first value.

According to an embodiment, the DRP option may include try.snk or try.src, and the selecting a DRP option may be referred to as selecting one of try.snk or try.src. When the role of the electronic device 301 in terms of power is preliminarily a source, try.snk may be referred to as changing the role from a source to a sink. For example, try.snk may be referred to as changing the value from the first value to the second value. When the role of the electronic device 301 in terms of power is preliminarily a sink, try.src may be referred to as changing the role from a sink to a source. For example, try.src may be referred to as changing the value from the second value to the first value. The preliminary role of the electronic device 301 in terms of power may be referred to as a role of the electronic device 301 temporarily determined according to a value corresponding to the electrical information of the CC pin identified at the first time point in a state in which the value is not fixed to one of the first value or the second value. For example, when the value corresponding to the electrical information of the CC pin identified at the first time point in a state in which the value is not fixed to one of the first value or the second value is the first value, the electronic device 301 may temporarily serve as a source.

According to an embodiment, when the DRP toggling is performed for a critical time in a state in which the electronic device 301 selects try.snk, the electronic device 301 may identify that try.snk is not appropriate. In response to the identifying that try.snk is not appropriate, the electronic device 301 may change try.snk to disable or try.src.

According to an embodiment, when the DRP toggling is performed for a critical time in a state in which the electronic device 301 selects try.src, the electronic device 301 may identify that try.src is not appropriate. In response to the identifying that try.src is not appropriate, the electronic device 301 may change try.src to disable or try.snk.

According to an embodiment, the electronic device 301 (for example, the PDIC 405) may select at least one of the first method, the second method, or the third method.

TABLE 1

|  | First method | Second method | Third method |
| --- | --- | --- | --- |
| Case 1 | 1 | 2 | 3 |
| Case 2 | 1 | 1 | 2 |
| Case 3 | 1 | 1 | 1 |

Table 1 shows a combination and order of the first method, the second method, and the third method. The numbers shown in Table 1 may be referred to as the order.

According to an embodiment, case 1 may show a case in which the electronic device 301 sequentially applies the first method, the second method, and the third method, one method at a time. For example, as shown in Table 1, the electronic device 301 (for example, the PDIC 405) may apply the first method, the second method, and the third method one at a time according to the order shown in Table 1. The application order may not be limited to the order shown in Table 1. For example, although not shown in Table 1, the electronic device 301 may sequentially apply the third method, the second method, and the first method one at a time.

According to an embodiment, the electronic device 301 (for example, the PDIC 405) may apply one of the methods for every designated time. The electronic device 301 may sequentially apply one of the methods at the same time interval. For example, the electronic device 301 may sequentially apply the first method, the second method, and the third method for 150 ms for each method.

According to an embodiment, the electronic device 301 may sequentially apply one of the methods at different time intervals. For example, the electronic device 301 may apply the first method for 150 ms, the second method for 75 ms, and then third method for 150 ms. The different intervals may not be limited to the embodiment described above.

According to an embodiment, case 2 may show a case in which the electronic device 301 applies two of the first method, the second method, and the third method at the same time and applies the other one separately. For example, as shown in Table 1, the electronic device 301 (for example, the PDIC 405) may apply the first method and the second method at the same time and then apply the third method. The combination or application order of the methods may not be limited to those shown in Table 1. For example, although not shown in Table 1, the electronic device 301 may apply the second method and the third method at the same time and then apply the first method. For another example, the electronic device 301 may apply the third method and then apply the first method and the second method at the same time.

According to an embodiment, the electronic device 301 may apply two among the three methods (for example, the first method, the second method, and the third method) and the other one for every designated time. The electronic device 301 may apply two among the three methods and the other one for the same time interval. For example, the electronic device 301 may apply the first method and the second method at the same time for 150 ms and then apply the third method for 150 ms.

According to an embodiment, the electronic device 301 may apply two among the three methods and the other one for different time intervals. For example, the electronic device 301 may apply the first method and the second method at the same time for 150 ms and then apply the third method for 75 ms.

According to an embodiment, case 3 may show a case in which the electronic device 301 simultaneously applies the first method, the second method, and the third method.

In operation 611, the electronic device 301 (for example, the PDIC 405) may determine a role of the electronic device 301 in terms of power, based on that the value is fixed to one of the first value or the second value. For example, when a value corresponding to the electrical information of the CC pin (for example, the CC1 pin 423-1 or the CC2 pin 423-2 in FIG. 5) included in the electronic device 301 is fixed to the first value, the electronic device 301 (for example, the PDIC 405) may determine that the electronic device 301 serves as a source. For another example, when a value corresponding to the electrical information of the CC pin (for example, the CC1 pin 423-1 or the CC2 pin 423-2 in FIG. 5) included in the electronic device 301 is fixed to the second value, the electronic device 301 (for example, the PDIC 405) may determine that the electronic device 301 serves as a sink. The electrical information may include information on a resistance. The first value and the second value may be referred to as a pull-up resistance value and a pull-down resistance value, respectively.

According to an embodiment, FIG. 6 shows that operation 609 is performed by the electronic device 301 when a value corresponding to the electrical information of the CC pin is not fixed to one of the first value or the second value in operation 607, but operation 609 may be performed between operation 601 and operation 603. For example, when the electronic device 301 is powered on and the PDIC 405 is powered on, the electronic device 301 may apply at least one of the first method, the second method, or the third method to perform the DRP toggling.

According to an embodiment, when the PDIC 405 is reset due to source-disconnection or sink-disconnection, the electronic device 301 may apply at least one of the first method, the second method, or the third method to perform the DRP toggling.

According to an embodiment, the electronic device 301 may include a connector 330 including multiple conductive terminals, a battery 340, and a power control circuit 320 electrically connected to the connector 330 and the battery 340. The power control circuit 320 may control a value corresponding to electrical information on a first conductive terminal among the multiple conductive terminals so that a first time interval during which a first value is maintained and a second time interval during which a second value is maintained after the first time interval are alternated for each time interval among the multiple time intervals, identify, in response to the connection of the electronic device 301 to the external device 202 through the USB type C cable 211 connected to the connector 330, whether a size of a time, during which the value is maintained as one of the first value or the second value, is smaller than a designated value, select, in response to the identifying that a size of a time, during which the value is maintained as one of the first value or the second value, is smaller than the designated value, the first method of differently changing a size of the first time interval for each time interval after a first time point at which the electronic device 301 is connected to the external device 202 among the multiple time intervals, and control, based on the selected first method, the value to be alternated for each time interval after the first time point among the multiple time intervals.

According to an embodiment, the power control circuit 320 may select, in response to the identifying that a size of a time, during which the value is maintained as one of the first value or the second value, is smaller than the designated value, at least one of the first method or the second method wherein the second method is a method of changing a first ratio of the first time interval to each time interval and a second ratio of the second time interval to each time interval for each time interval after the first time point, and control, based on the selected at least one method, the value to be alternated for each time interval after the first time point among the multiple time intervals.

According to an embodiment, the power control circuit 320 may select, in response to the identifying that a size of a time, during which the value is maintained as one of the first value or the second value, is smaller than the designated value, at least one of the first method, the second method, or the third method wherein the third method is a method of swapping the first value and the second value for each other for each time interval after the first time point among the multiple time intervals, and control, based on the selected at least one method, the value to be alternated for each time interval after the first time point among the multiple time intervals.

According to an embodiment, the multiple conductive terminals may be arranged to comply with the USB type C standard.

According to an embodiment, the first conductive terminal may correspond to CC 1 terminal or CC 2 terminal among the conductive terminals arranged to comply with the USB type C standard.

According to an embodiment, the value corresponding to the electrical information may include a resistance value, the first value may correspond to a pull-up resistance value, and the second value may correspond to a pull-down resistance value.

According to an embodiment, the USB type C cable 211 may include a first cable connector 211-1 and a second cable connector 211-2 each including conductive terminals arranged to comply with the USB type C standard at one end and the other end of the USB type C cable 211, respectively, the connector 330 may be connected to the first cable connector 211-1 of the USB type C cable 211, and the second cable connector 211-2 of the USB type C cable 211 may be connected to an external connector (for example, the second connector 210-2) including conductive terminals arranged to comply with the USB type C standard and included in the external device 202 so that the electronic device 301 may be connected to the external device 202.

According to an embodiment, the power control circuit 320 may determine, in response to the fact that a size of a time, during which the value is maintained as one of the first value or the second value, is larger than the designated value, whether the electronic device 301 supplies power to the external device 202 or the electronic device 301 receives power from the external device 202.

According to an embodiment, in response to identifying that a size of a time, during which the value is maintained as the first value, is larger than the designated value, the power control circuit 320 may supply power from the electronic device 301 to the external device 202.

According to an embodiment, in response to identifying that a size of a time, during which the value is maintained as the second value, is larger than the designated value, the power control circuit 320 may receive power from the external device 202 and charge the battery 340 by using the received power.

According to an embodiment, the first method may randomly determine a size of the first time interval within a designated range for each time interval after the first time point among the multiple time intervals.

According to an embodiment, the electronic device 301 may further include a processor 310 electrically connected to the power control circuit 320. When the power control circuit 320 identifies that a size of a time, during which the value is maintained as one of the first value or the second value, is larger than the designated value, the power control circuit 320 may provide the electrical information on the first conductive terminal to the processor 310. The processor 310 may perform data communication with the external device 202 through the connector 330, based on the electrical information received from the power control circuit 320.

According to an embodiment, when the power control circuit 320 selects at least two methods from among the first method, the second method, or the third method, the power control circuit 320 may determine an order of the selected at least two methods, and apply, based on the determined order, the selected at least two methods for each time interval after the first time point among the multiple time intervals so as to control the value to be alternated.

According to an embodiment, when the power control circuit 320 selects at least two methods among the first method, the second method, or the third method, the power control circuit 320 may apply the selected at least two methods at the same time for each time interval after the first time point among the multiple time intervals so as to control the value to be alternated.

According to an embodiment, a method for operating the electronic device 301 may include an operation of controlling a value corresponding to electrical information on a first conductive terminal among the multiple conductive terminals included in the connector 330 so that a first time interval during which a first value is maintained and a second time interval during which a second value is maintained after the first time interval are alternated for each time interval among the multiple time intervals, an operation of identifying, in response to the connection of the electronic device 301 to the external device 202 through the USB type C cable 211 connected to in the connector 330, whether a size of a time, during which the value is maintained as one of the first value or the second value, is smaller than a designated value, an operation of selecting, in response to the identifying that a size of a time, during which the value is maintained as one of the first value or the second value, is smaller than the designated value, the first method of differently changing a size of the first time interval for each time interval after a first time point at which the electronic device 301 is connected to the external device 202 among the multiple time intervals, and an operation of controlling, based on the selected first method, the value to be alternated for each time interval after the first time point among the multiple time intervals.

According to an embodiment, the method for operating the electronic device 301 may include an operation of selecting, in response to the identifying that a size of a time, during which the value is maintained as one of the first value or the second value, is smaller than the designated value, at least one of the first method or the second method wherein the second method is a method of changing a first ratio of the first time interval to each time interval and a second ratio of the second time interval to each time interval for each time interval after the first time point, and an operation of controlling, based on the selected at least one of the first method or the second method, the value to be alternated for each time interval after the first time point among the multiple time intervals.

According to an embodiment, the method for operating the electronic device 301 may include an operation of selecting, in response to the identifying that a size of a time, during which the value is maintained as one of the first value or the second value, is smaller than the designated value, at least one of the first method, the second method, or a third method wherein the third method is a method of swapping the first value and the second value for each other for each time interval after the first time point among the multiple time intervals, and an operation of controlling, based on the selected at least one of the first method, the second method, or the third method, the value to be alternated for each time interval after the first time point among the multiple time intervals.

According to an embodiment, the multiple conductive terminals may be arranged to comply with the USB type C standard.

According to an embodiment, the first conductive terminal may correspond to CC 1 terminal or CC 2 terminal among the conductive terminals arranged to comply with the USB type C standard.

According to an embodiment, the value corresponding to the electrical information may include a resistance value, the first value may correspond to a pull-up resistance value, and the second value may correspond to a pull-down resistance value.

Figure 7:
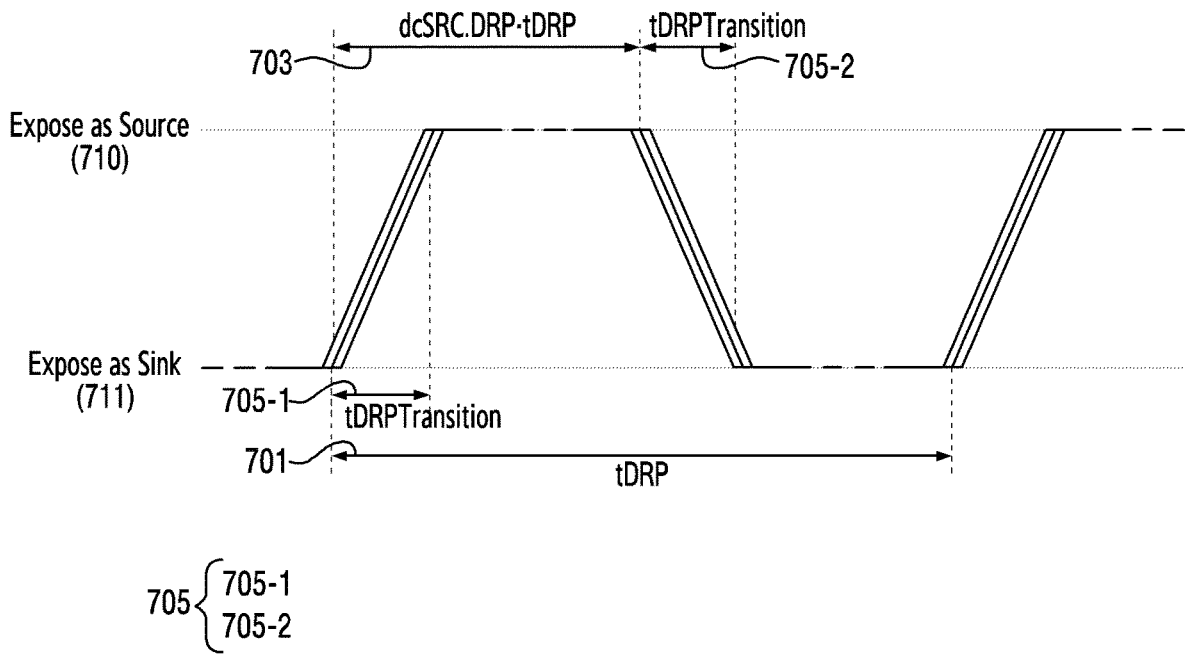
FIG. 7 shows a diagram illustrating a timing parameter related to DRP toggling according to an embodiment of the disclosure.

FIG. 7 shows a diagram illustrating a timing parameter related to DRP toggling according to an embodiment of the disclosure.

Referring to FIG. 7, according to an embodiment, the DRP toggling may indicate that a value corresponding to the electrical information on the CC pin (for example, the CC1 pin 423-1 or the CC2 pin 423-2 in FIG. 5) is alternately changed to the first value 710 and the second value 711 for each time interval. In the time interval in which the value corresponding to the electrical information of the CC pin becomes the first value 710, the electronic device 301 may preliminarily serve as a source in terms of power. In the time interval in which the value corresponding to the electrical information of the CC pin becomes the second value 711, the electronic device 301 may preliminarily serve as a sink in terms of power.

According to an embodiment, the timing parameter of the DRP toggling may include tDRP 701, dcSRC.DRP·tDRP 703, and tDRPTransition 705 (705-1 and 705-2).

According to an embodiment, the tDRP 701 may be referred to as a single period corresponding to the total of the times in which the value is changed once each to the first value and the second value so that the electronic device 301 preliminarily serves once each as a source and a sink. tDRP 701 may have a value of 50 ms to 100 ms.

According to an embodiment, dcSRC.DRP·tDRP 703 may be referred to as a time during which the electronic device 301 may serve as a source in tDRP 701. dcSRC.DRP·tDRP 703 may include tDRPTransition 705-1. The value may be maintained as the first value for a time obtained by subtracting tDRPTransition 705-1 from dcSRC.DRP·tDRP 703. The electronic device 301 may preliminarily serve as a source for the time of maintaining the first value. dcSRC.DRP may have a value of 30% to 70%. tDRPTransition 705-1 and 705-2 may have a maximum value of 1 ms.

Figure 8A:
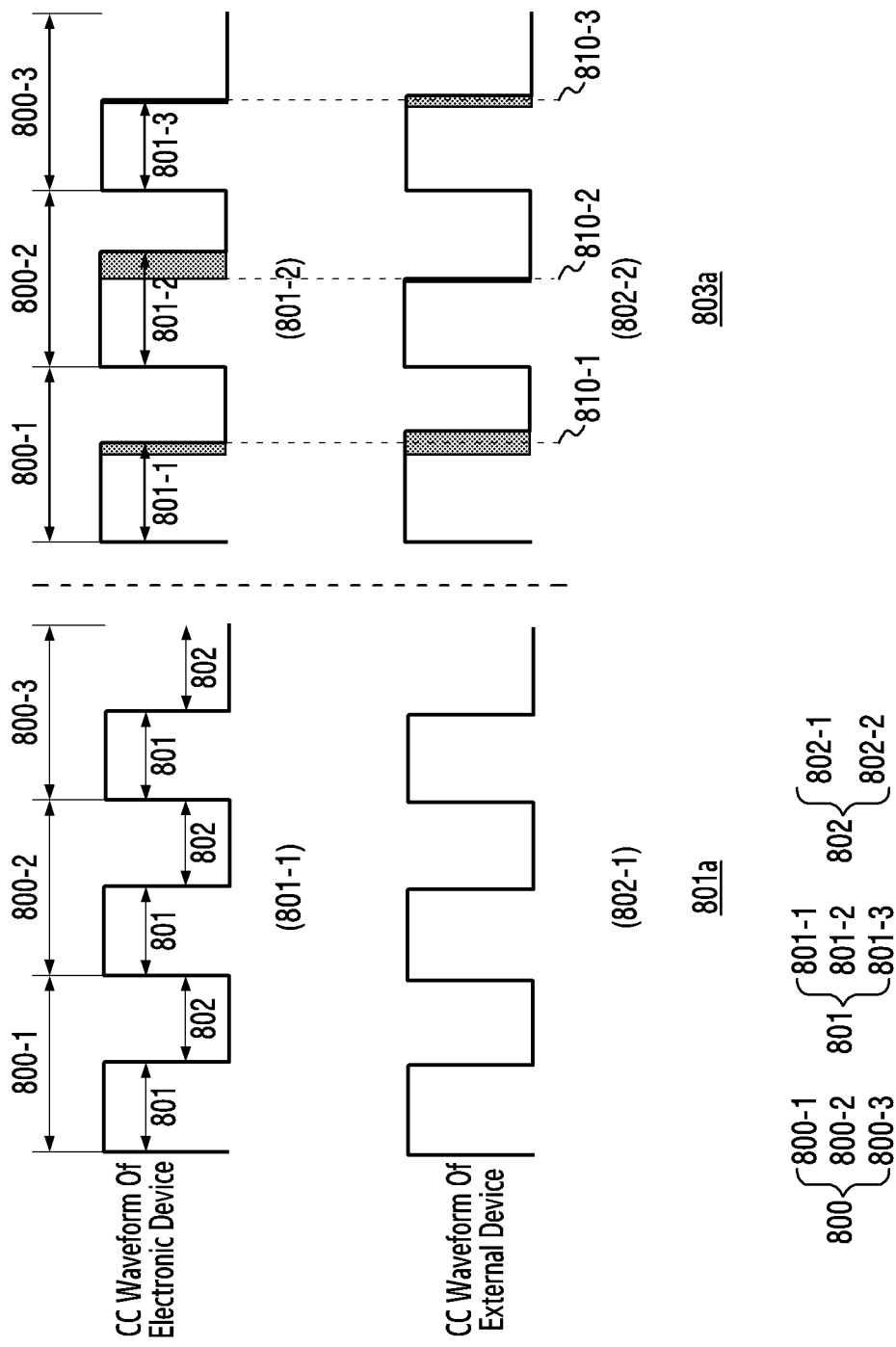
FIG. 8A shows a diagram illustrating a case in which a random delay is applied to DRP toggling timing according to an embodiment of the disclosure.

FIG. 8A shows a diagram illustrating a case in which a random delay is applied to DRP toggling timing according to an embodiment of the disclosure. 801a in FIG. 8A shows a CC waveform of the electronic device 301 and a CC waveform of the external device 202 in a state in which the first method, the second method, and the third method are not applied, and 803a in FIG. 8A shows a CC waveform of the electronic device 301 and a CC waveform of the external device 202 in a state in which the first method is applied.

According to 801-1 of 801a, the CC waveform of the electronic device 301 may have a form alternately changed so that a first time 801 and a second time 802, in which a value corresponding to electrical information of the CC pin is maintained as a first value and a second value, respectively, occupy the same proportion in each time interval 800 (for example, a first time interval 800-1, a second time interval 800-2, and a third time interval 800-3). Each of the first time interval 800-1, the second time interval 800-2, and the third time interval 800-3 may have the same ratio of times during which the first time 801 and the second time 802 are maintained. According to 802-1 of 801a, the CC waveform of the external device 202 may be the same as the CC waveform of the electronic device 301 shown in 801-1 of 801a.

According to an embodiment, each of the value corresponding to the electrical information of the CC pin included in the electronic device 301 and the value corresponding to the electrical information of the CC pin included in the external device 202 may be fixed to different values at a time point when the value corresponding to the electrical information of the CC pin included in the electronic device 301 and the value corresponding to the electrical information of the CC pin included in the external device 202 respectively correspond to different values (for example, the first value or the second value). For example, at the time point, the value corresponding to the electrical information of the CC pin included in the electronic device 301 may be fixed to the first value and the value corresponding to the electrical information of the CC pin included in the external device 202 may be fixed to the second value.

According to 801a, in a state in which the first method, the second method, and the third method are not applied, the CC waveform of the electronic device 301 may be synchronized with the CC waveform of the external device 202. In other words, a time point at which the value corresponding to the electrical information of the CC pin included in the electronic device 301 and the value corresponding to the electrical information of the CC pin included in the external device 202 are different may not exist. When the CC waveform of the electronic device 301 is synchronized with the waveform of the CC waveform of the external device 202, the value may not be fixed to one of the first value or the second value. When the value is not fixed to one of the first value or the second value, the role of the electronic device 301 in terms of power may not be determined.

According to 801-2 of 803a, in a state in which the electronic device 301 applies the first method, the CC waveform of the electronic device 301 may have a form in which a size of the first time is changed, during which the value corresponding to the electrical information of the CC pin for each time interval (for example, the first time interval 800-1, the second time interval 800-2, and the third time interval 800-3) is maintained. A size of the first time may be determined as a predetermined size within a range of 0 to 10 ms in unit of 1 ms. For example, sizes of the first time 801 included in each of the first time interval 800-1, the second time interval 800-2, and the third time interval 800-3 in 801-1 may be respectively changed to a size of the first time 801-1 of the first time interval 800-1, a size of the first time 801-2 of the second time interval 800-2, and a size of the first time 801-3 of the third time interval 800-3 in 801-2. When compared with the CC waveform of the external device 202 of 802-1 in 801a, the time during which the first value of the CC waveform of the external device 202 of 802-2 in 803a is maintained may be differently changed for each time interval.

According to 803a in FIG. 8A, when the first method is applied, at a first time point 810-1, a second time point 810-2, and a third time point 810-3, the value corresponding to the electrical information of the CC pin included in the electronic device 301 and the value corresponding to the electrical information of the CC pin included in the external device 202 each may have different values. Although 801-2 and 802-2 in 803a show the first time point 810-1, the second time point 810-2, and the third time point 810-3 together for the convenience of description, when the value corresponding to the electrical information of the CC pin included in the electronic device 301 and the value corresponding to the electrical information of the CC pin included in the external device 202 each have different values at each time point, the value corresponding to the electrical information of the CC pin included in the electronic device 301 and the value corresponding to the electrical information of the CC pin included in the external device 202 after each time point may be fixed to different values, respectively. For example, when a time point at which the values corresponding to electrical information of the CC pins respectively included in the electronic device 301 and the external device 202 first differ from each other after the first method has been applied is the first time point 810-1, after the first time point 810-1, the value corresponding to the electrical information of the CC pin included in the electronic device 301 may be fixed to the second value and the value corresponding to the electrical information of the CC pin included in the external device 202 may be fixed to the first value. For another example, when a time point at which the values corresponding to electrical information of the CC pins respectively included in the electronic device 301 and the external device 202 first differ from each other after the first method has been applied is the second time point 810-2, after the second time point 810-2, the value corresponding to the electrical information of the CC pin included in the electronic device 301 may be fixed to the first value and the value corresponding to the electrical information of the CC pin included in the external device 202 may be fixed to the second value. For another example, when a time point at which the values corresponding to electrical information of the CC pins respectively included in the electronic device 301 and the external device 202 first differ from each other after the first method has been applied is the third time point 810-3, after the third time point 810-3, the value corresponding to the electrical information of the CC pin included in the electronic device 301 may be fixed to the second value and the value corresponding to the electrical information of the CC pin included in the external device 202 may be fixed to the first value.

Figure 8B:
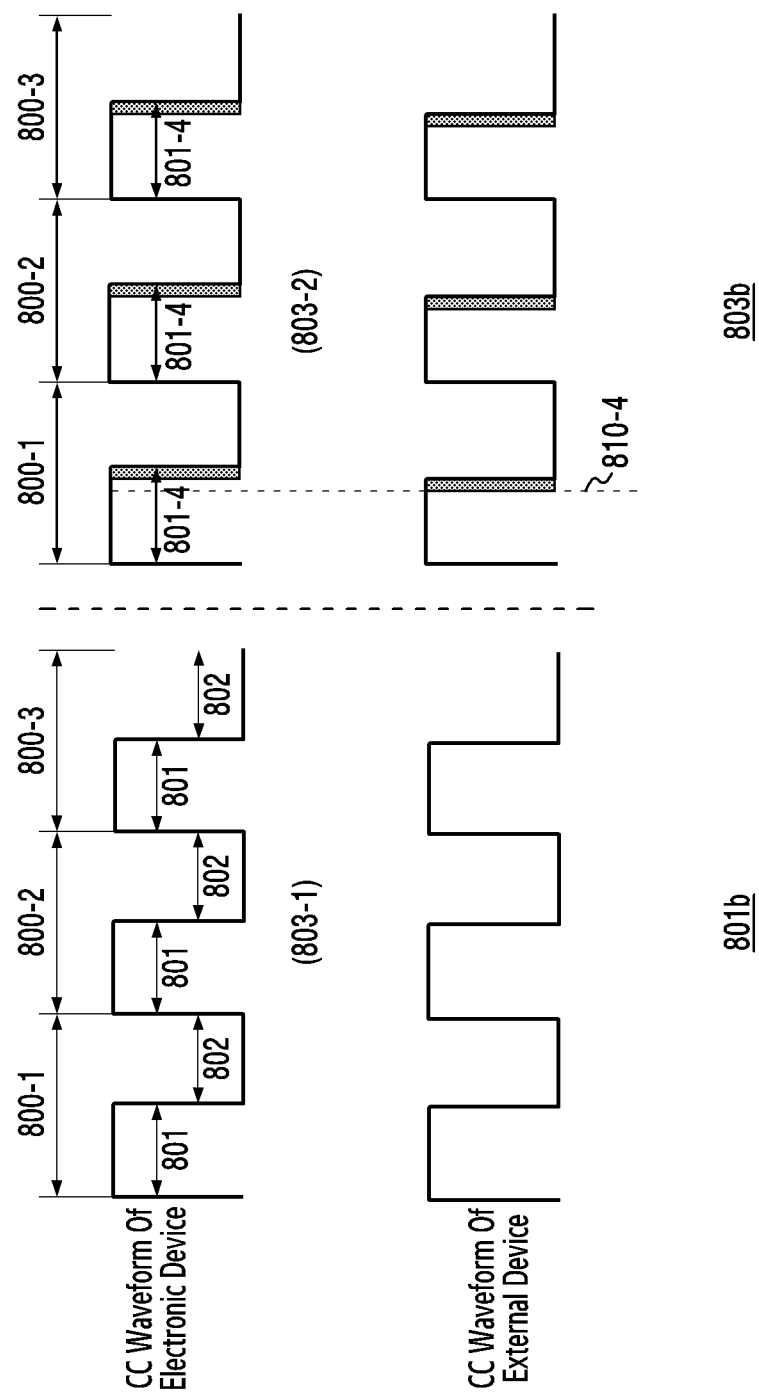
FIG. 8B shows a diagram illustrating a case in which a duty ratio change is applied to DRP toggling timing according to an embodiment of the disclosure.

FIG. 8B shows a diagram illustrating a case in which a duty ratio change is applied to DRP toggling timing according to an embodiment of the disclosure.

801b in FIG. 8B shows a CC waveform of the electronic device 301 and a CC waveform of the external device 202 in a state in which the first method, the second method, and the third method are not applied, and 803b in FIG. 8B shows a CC waveform of the electronic device 301 and a CC waveform of the external device 202 in a state in which the second method is applied. Hereinafter, overlapping description with the description for FIG. 8A will be omitted. The description for the CC waveform shown in 801b in FIG. 8B is the same as the description for the CC waveform shown in 801a in FIG. 8A.

According to 803-2 of 803b, in a state in which the electronic device 301 applies the second method, the CC waveform of the electronic device 301 may have a form in which a size of a first ratio is changed, the first ratio corresponding to a ratio of the first time during which the value corresponding to the electrical information of the CC pin in each time interval (for example, the first time interval 800-1, the second time interval 800-2, and the third time interval 800-3) is maintained as the first value. A size of the first ratio may be determined as a predetermined size within a range of 30% to 70% in unit of 5%. For example, a size of the first ratio may be changed as much as sizes of the first time 801 included in each of the first time interval 800-1, the second time interval 800-2, and the third time interval 800-3 in 803-1 are respectively changed to a sizes of the first time 801-4 included in each of in the first time interval 800-1, the second time interval 800-2, and the third time interval 800-3 in 803-2.

According to 803b in FIG. 8B, when the second method is applied, at a fourth time point 810-4, the value corresponding to the electrical information of the CC pin included in the electronic device 301 and the value corresponding to the electrical information of the CC pin included in the external device 202 each may have different values. For example, when a time point at which the values corresponding to electrical information of the CC pins respectively included in the electronic device 301 and the external device 202 first differ from each other after the second method has been applied is the fourth time point 810-4, after the fourth time point 810-4, the value corresponding to the electrical information of the CC pin included in the electronic device 301 may be fixed to the first value and the value corresponding to the CC pin included in the external device 202 may be fixed to the second value.

Figure 9A:
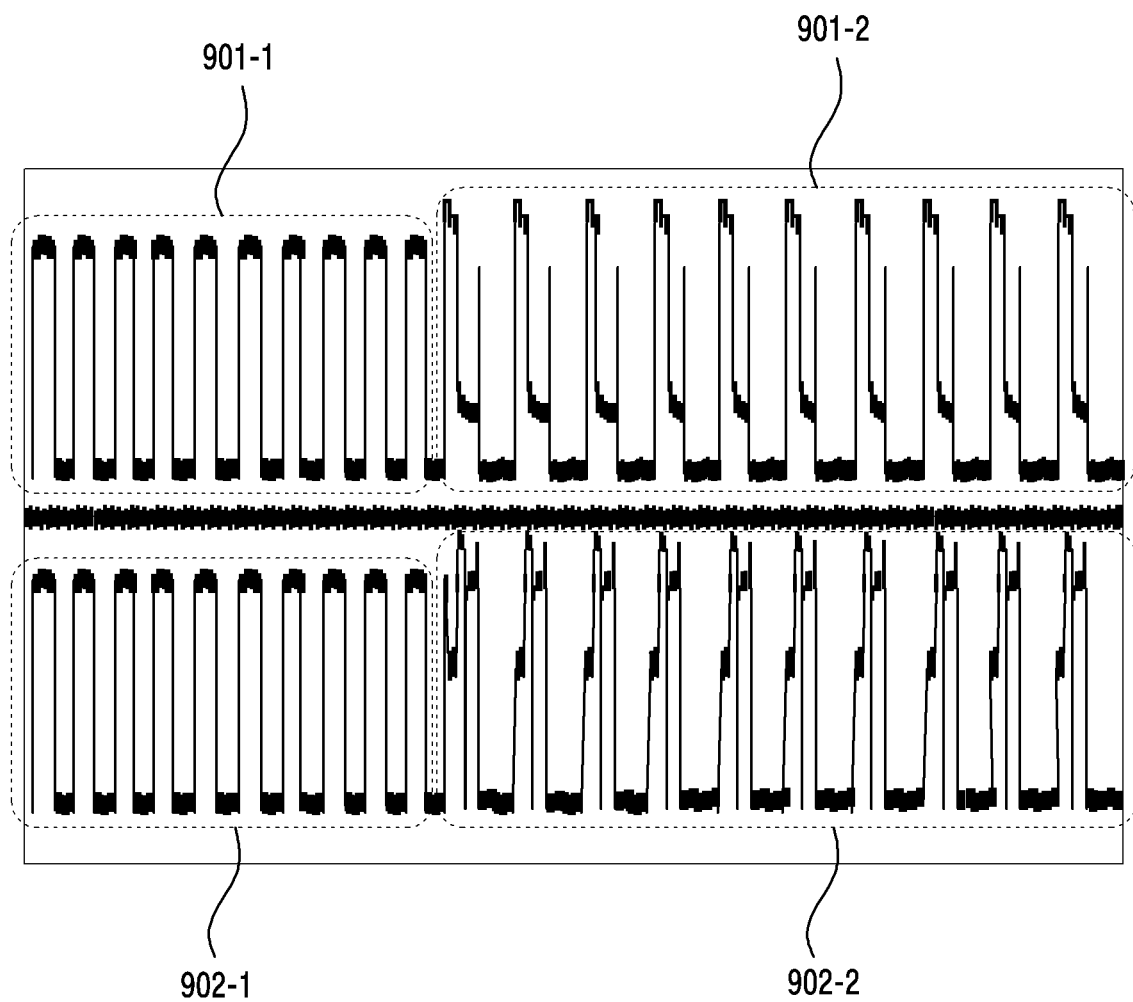
FIG. 9A shows a waveform with respect to DRP toggling timing according to an embodiment of the disclosure.

FIG. 9A shows a waveform with respect to DRP toggling timing according to an embodiment of the disclosure.

Referring to FIG. 9A, 901-1 and 901-2 show a CC waveform of an electronic device 301, and 902-1 and 902-2 show the CC waveform of an external electronic device 202.

901-1 shows the CC waveform generated by the CC pin included in the electronic device 301 while the electronic device 301 is performing the DRP toggling before the electronic device 301 is connected to the external device 202 through the USB type C cable 211.

902-1 shows the CC waveform generated by the CC pin included in the external device 202 while the external device 202 is performing the DRP toggling before the electronic device 301 is connected to the external device 202 through the USB type C cable 211.

901-2 shows that the electronic device 301 is incapable of fixing the value corresponding to the electrical state of the CC pin to one of the first value or the second value and alternately changes the value after the electronic device 301 is connected to the external device 202 through the USB type C cable 211.

902-2 shows that the external device 202 is incapable of fixing the value corresponding to the electrical state of the CC pin to one of the first value or the second value and alternately changes the value after the electronic device 301 is connected to the external device 202 through the USB type C cable 211.

According to FIG. 9A, as the value corresponding to the electrical state of the CC pin included in the electronic device 301 and the value corresponding to the electrical state of the CC pin included in the external device 202 are not fixed to one of the first value or the second value, the roles of the electronic device 301 and the external device 202 in terms of power may not be determined.

Figure 9B:
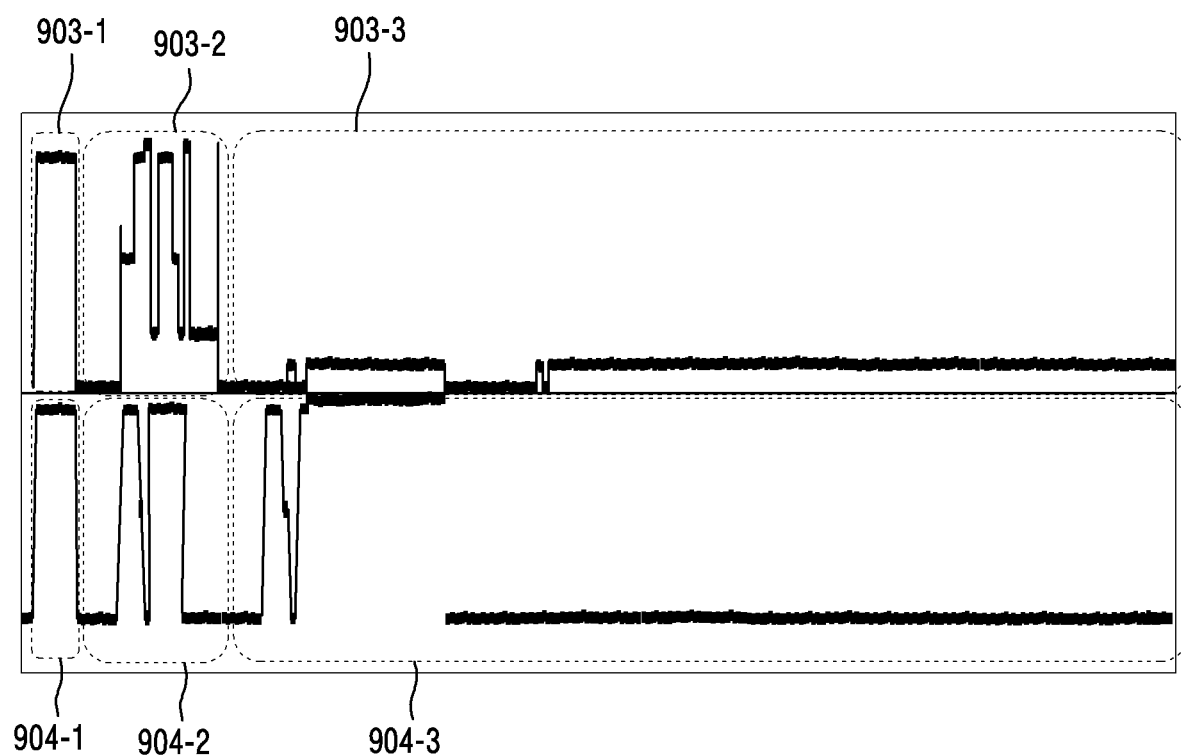
FIG. 9B shows a waveform with respect to DRP toggling timing according to an embodiment of the disclosure.

FIG. 9B shows a waveform with respect to DRP toggling timing according to an embodiment of the disclosure.

Referring to FIG. 9B, 903-1, 903-2, and 903-3 show a CC waveform of an electronic device 301, and 904-1, 904-2, and 904-3 show a CC waveform of an external device 202.

903-1 shows the CC waveform generated by the CC pin included in the electronic device 301 while the electronic device 301 is performing the DRP toggling before the electronic device 301 is connected to the external device 202 through the USB type C cable 211.

904-1 shows the CC waveform generated by the CC pin included in the external device 202 while the external device 202 is performing the DRP toggling before the electronic device 301 is connected to the external device 202 through the USB type C cable 211.

903-2 shows the CC waveform generated by the CC pin included in the electronic device 301 while the electronic device 301 applies at least one of the first method, the second method, or the third method.

904-2 shows the CC waveform generated by the CC pin included in the external device 202 while the external device 202 applies at least one of the first method, the second method, or the third method.

903-3 shows that the electronic device 301 fixes the value corresponding to the electrical state of the CC pin to one of the first value or the second after the electronic device 301 is connected to the external device 202 through the USB type C cable 211.

904-3 shows that the external device 202 fixes the value corresponding to the electrical state of the CC pin to one of the first value or the second after the electronic device 301 is connected to the external device 202 through the USB type C cable 211.

According to FIG. 9B, as the value corresponding to the electrical state of the CC pin included in the electronic device 301 and the value corresponding to the electrical state of the CC pin included in the external device 202 are fixed to one of the first value or the second value, the roles of the electronic device 301 and the external device 202 in terms of power may be determined.

Advantageous effects obtainable from the disclosure may not be limited to the above-mentioned effects, and other effects which are not mentioned may be clearly understood, through the following descriptions, by those skilled in the art to which the disclosure pertains.

The methods according to various embodiments described in the claims or the specification of the disclosure may be implemented by hardware, software, or a combination of hardware and software.

When the methods are implemented by software, a computer-readable storage medium for storing one or more programs (software modules) may be provided. The one or more programs stored in the computer-readable storage medium may be configured for execution by one or more processors within the electronic device. The at least one program may include instructions that cause the electronic device to perform the methods according to various embodiments of the disclosure as defined by the appended claims and/or disclosed herein.

The programs (software modules or software) may be stored in non-volatile memories including a random access memory and a flash memory, a read only memory (ROM), an electrically erasable programmable read only memory (EEPROM), a magnetic disc storage device, a compact disc-ROM (CD-ROM), digital versatile discs (DVDs), or other type optical storage devices, or a magnetic cassette. Alternatively, any combination of some or all of them may form a memory in which the program is stored. Further, a plurality of such memories may be included in the electronic device.

In addition, the programs may be stored in an attachable storage device which may access the electronic device through communication networks such as the Internet, Intranet, Local Area Network (LAN), Wide LAN (WLAN), and Storage Area Network (SAN) or a combination thereof. Such a storage device may access the electronic device via an external port. Further, a separate storage device on the communication network may access a portable electronic device.

In the above-described detailed embodiments of the disclosure, an element included in the disclosure is expressed in the singular or the plural according to presented detailed embodiments. However, the singular form or plural form is selected appropriately to the presented situation for the convenience of description, and the disclosure is not limited by elements expressed in the singular or the plural. Therefore, either an element expressed in the plural may also include a single element or an element expressed in the singular may also include multiple elements.

Although specific embodiments have been described in the detailed description of the disclosure, various modifications and changes may be made thereto without departing from the scope of the disclosure. Therefore, the scope of the disclosure should not be defined as being limited to the embodiments, but should be defined by the appended claims and equivalents thereof.

What is claimed is:

1. An electronic device comprising:
a connector comprising multiple conductive terminals;
a battery; and
a power control circuit electrically connected to the connector and the battery,
wherein the power control circuit is configured to:
control a value corresponding to electrical information of a first conductive terminal among the multiple conductive terminals so that a first time interval, during which a first value is maintained, and a second time interval, during which a second value is maintained after the first time interval, are alternated for each time interval among multiple time intervals,
identify, in response to the connection of the electronic device to an external device through a cable connected to the connector, whether a size of a time, during which the value is maintained as one of the first value or the second value, is smaller than a designated value,
select, in response to the identifying that the size of the time, during which the value is maintained as one of the first value or the second value, is smaller than the designated value, a first method of differently changing a size of the first time interval for each time interval after a first time point at which the electronic device is connected to the external device among the multiple time intervals, and
control, based on the selected first method, the value to be alternated for each time interval after the first time point among the multiple time intervals.

2. The electronic device of claim 1,
wherein the power control circuit is further configured to:
select, in response to the identifying that a size of a time, during which the value is maintained as one of the first value or the second value, is smaller than the designated value, at least one of the first method or a second method, wherein the second method is a method of changing a first ratio of the first time interval to each time interval and a second ratio of the second time interval to each time interval for each time interval after the first time point; and
control, based on the selected at least one of the first method or the second method, the value to be alternated for each time interval after the first time point among the multiple time intervals.

3. The electronic device of claim 2,
wherein the power control circuit is further configured to:
select, in response to the identifying that a size of a time, during which the value is maintained as one of the first value or the second value, is smaller than the designated value, at least one of the first method, the second method, or a third method, wherein the third method is a method of swapping the first value and the second value for each time interval after the first time point among the multiple time intervals; and
control, based on the selected at least one of the first method, the second method, or the third method, the value to be alternated for each time interval after the first time point among the multiple time intervals.

4. The electronic device of claim 1,
wherein the multiple conductive terminals are arranged to comply with a universal serial bus (USB) type C standard.

5. The electronic device of claim 1,
wherein the first conductive terminal corresponds to configuration channel (CC) 1 terminal or CC 2 terminal among conductive terminals arranged to comply with a USB type C standard.

6. The electronic device of claim 1,
wherein the value corresponding to the electrical information comprises a resistance value,
wherein the first value corresponds to a pull-up resistance value, and
wherein the second value corresponds to a pull-down resistance value.

7. The electronic device of claim 1,
wherein the cable comprises a first connector and a second connector comprising conductive terminals arranged to comply with a USB type C standard at one end and another end thereof, and
wherein the connector is connected to the first connector of the cable and the second connector of the cable is connected to an external connector comprising conductive terminals arranged to comply with the USB type C standard and included in the external device so that the electronic device is connected to the external device.

8. The electronic device of claim 1,
wherein the power control circuit is further configured to:
determine, in response to a size of a time larger than the designated value, during which the value is maintained as one of the first value or the second value, whether the electronic device is to supply power to the external device or the electronic device is to receive power from the external device.

9. The electronic device of claim 8,
wherein the power control circuit is further configured to:
in response to identifying that a size of a time, during which the value is maintained as the first value, is larger than the designated value, supply power from the electronic device to the external device.

10. The electronic device of claim 8,
wherein the power control circuit is further configured to:
in response to identifying that a size of a time, during which the value is maintained as the second value, is larger than the designated value, receive power from the external device; and
charge the battery by using the received power.

11. The electronic device of claim 1,
wherein the first method randomly determines a size of the first time interval within a designated range for each time interval after the first time point among the multiple time intervals.

12. The electronic device of claim 1, further comprising:
a processor electrically connected to the power control circuit,
wherein when the power control circuit identifies that a size of a time, during which the value is maintained as one of the first value or the second value, is larger than the designated value, the power control circuit provides electrical information on the first conductive terminal to the processor, and wherein the processor performs data communication with the external device through the connector, based on the electrical information received from the power control circuit.

13. The electronic device of claim 3,
wherein, in response to the power control circuit selecting at least two methods from among the first method, the second method, or the third method, the power control circuit is further configured to:
- determine an order of the selected at least two methods; and
- apply, based on the determined order, the selected at least two methods for each time interval after the first time point among the multiple time intervals so as to control the value to be alternated.

14. The electronic device of claim 3,
wherein, in response to the power control circuit selecting at least two methods from among the first method, the second method, or the third method, the power control circuit is further configured to:
- apply the selected at least two methods at a same time for each time interval after the first time point among the multiple time intervals so as to control the value to be alternated.

15. A method for operating an electronic device, the method comprising:
- controlling a value corresponding to electrical information of a first conductive terminal among multiple conductive terminals included in a connector so that a first time interval during which a first value is maintained, and a second time interval during which a second value is maintain after the first time interval are alternated for each time interval among multiple time intervals;
- identifying, in response to connection of the electronic device to an external device through a cable connected to the connector, whether a size of a time, during which the value is maintained as one of the first value or the second value, is smaller than a designated value;
- selecting, in response to the identifying that the size of the time, in which the value is maintained as one of the first value or the second value, is smaller than the designated value, a first method of differently changing a size of the first time interval for each time interval after a first time point at which the electronic device is connected to the external device among the multiple time intervals; and
- controlling, based on the selected first method, the value to be alternated for each time interval after the first time point among the multiple time intervals.

16. The method of claim 15, comprising:
- selecting, in response to the identifying that a size of a time, during which the value is maintained as one of the first value or the second value, is smaller the designated value, at least one of the first method or a second method, wherein the second method is a method of changing a first ratio of the first time interval to each time interval and a second ratio of the second time interval to each time interval for each time interval after the first time point; and
- controlling, based on the selected at least one of the first method or the second method, the value to be alternated for each time interval after the first time point among the multiple time intervals.

17. The method of claim 16, comprising:
- selecting, in response to the identifying that the size of the time, during which the value is maintained as one of the first value or the second value, is smaller than the designated value, at least one of the first method, the second method, or a third method, wherein the third method is a method of swapping the first value and the second value for each other for each time interval after the first time point among the multiple time intervals; and
- controlling, based on the selected at least one of the first method, the second method, or the third method, the value to be alternated for each time interval after the first time point among the multiple time intervals.

18. The method of claim 15,
wherein the multiple conductive terminals are arranged to comply with a USB type C standard.

19. The method of claim 15,
wherein the first conductive terminal corresponds to CC 1 terminal or CC 2 terminal among conductive terminals arranged to comply with a USB type C standard.

20. The method of claim 15,
wherein the value corresponding to the electrical information comprises a resistance value,
wherein the first value corresponds to a pull-up resistance value, and
wherein the second value corresponds to a pull-down resistance value.

* * * * *